US010178102B1

(12) United States Patent
Engelberg

(10) Patent No.: US 10,178,102 B1
(45) Date of Patent: *Jan. 8, 2019

(54) CONTROLLING ACCESS TO DIGITAL ITEMS BASED ON A USER'S TIME OUTSIDE

(71) Applicant: Amazon Technologies, Inc., Seattle, WA (US)

(72) Inventor: Richard Harrison Engelberg, Seattle, WA (US)

(73) Assignee: Amazon Technologies, Inc., Seattle, WA (US)

(*) Notice: Subject to any disclaimer, the term of this patent is extended or adjusted under 35 U.S.C. 154(b) by 0 days.

This patent is subject to a terminal disclaimer.

(21) Appl. No.: 15/366,753

(22) Filed: Dec. 1, 2016

Related U.S. Application Data

(63) Continuation of application No. 14/494,338, filed on Sep. 23, 2014, now Pat. No. 9,516,099.

(51) Int. Cl.
*H04L 29/06* (2006.01)
*G06Q 20/12* (2012.01)

(52) U.S. Cl.
CPC .......... *H04L 63/102* (2013.01); *H04L 63/107* (2013.01); *G06Q 20/123* (2013.01)

(58) Field of Classification Search
CPC .... H04L 63/102; H04L 63/107; G06Q 20/123
See application file for complete search history.

(56) References Cited

U.S. PATENT DOCUMENTS

| 6,502,022 B1* | 12/2002 | Chastain | G01C 21/26 701/36 |
| 6,973,333 B1* | 12/2005 | O'Neil | H04W 48/04 340/425.5 |
| 8,010,037 B2* | 8/2011 | Bannwolf | G09B 7/02 434/350 |
| 8,201,224 B1* | 6/2012 | Spertus | G06F 21/6218 713/153 |
| 8,706,872 B2 | 4/2014 | Moussavian et al. | |
| 9,177,029 B1* | 11/2015 | Chau | G06F 17/30867 |
| 9,210,256 B1* | 12/2015 | Humphrey | H04M 3/2281 |
| 2003/0078784 A1* | 4/2003 | Jordan | G06F 3/16 704/275 |
| 2006/0052909 A1* | 3/2006 | Cherouny | B60K 28/063 701/1 |
| 2007/0150918 A1* | 6/2007 | Carpenter | G06F 21/10 725/25 |
| 2009/0170532 A1* | 7/2009 | Lee | H04M 1/72566 455/456.3 |
| 2011/0225368 A1* | 9/2011 | Burge, III | G06F 12/0862 711/118 |

(Continued)

*Primary Examiner* — Michael A Keller
*Assistant Examiner* — Javier O Guzman
(74) *Attorney, Agent, or Firm* — Athorus, PLLC

(57) ABSTRACT

This disclosure describes an account management service that allows a primary account user to establish weather constraints that will result in access to digital items to be restricted when current weather conditions correspond with the established weather constraints. For example, a primary account user may specify that, when the weather is sunny and between sixty-five degrees Fahrenheit and eighty degrees Fahrenheit, access to digital items by a secondary account user is to be restricted.

24 Claims, 13 Drawing Sheets

(56) References Cited

U.S. PATENT DOCUMENTS

| | | | |
|---|---|---|---|
| 2012/0079525 A1* | 3/2012 | Ellis | H04N 7/163 725/28 |
| 2012/0108200 A1* | 5/2012 | Rubin | H04L 47/14 455/405 |
| 2012/0250517 A1* | 10/2012 | Saarimaki | H04M 1/72569 370/241 |
| 2013/0047041 A1* | 2/2013 | Chen | G06F 11/004 714/47.3 |
| 2013/0151595 A1 | 6/2013 | Fernandez-Ruiz et al. | |
| 2013/0295913 A1* | 11/2013 | Matthews, III | H04M 1/72577 455/420 |
| 2014/0012977 A1* | 1/2014 | Moussavian | G06Q 50/20 709/224 |
| 2014/0207950 A1 | 7/2014 | Badiee et al. | |
| 2014/0258512 A1* | 9/2014 | Badiee | H04L 43/08 709/224 |
| 2015/0019266 A1 | 1/2015 | Stempora | |
| 2015/0256423 A1 | 9/2015 | Stearns | |

* cited by examiner

CONTROLLING ACCESS TO DIGITAL ITEMS BASED ON A USER'S TIME OUTSIDE

PRIORITY CLAIM

This application is a Continuation of U.S. patent application Ser. No. 14/494,338, filed Sep. 23, 2014, now U.S. Pat. No. 9,516,099, entitled "Controlling Access To Digital Items Based On Weather Conditions" which is incorporated herein by reference in its entirety.

BACKGROUND

The availability and use of digital devices, such as cell phones, tablets, laptops, and electronic books ("e-books"), has become widespread. People often access digital items, such as e-books (magazines, etc.), games, applications, movies, etc., on a daily basis often using different digital devices. With this increase in availability of digital items across multiple different digital devices, it has become difficult for parents to control, among other things, the quantity and types of content their children are accessing. Attempts have been made to resolve this problem but none provide an effective and safe environment across multiple devices for multiple different digital item types.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

Figure 1:
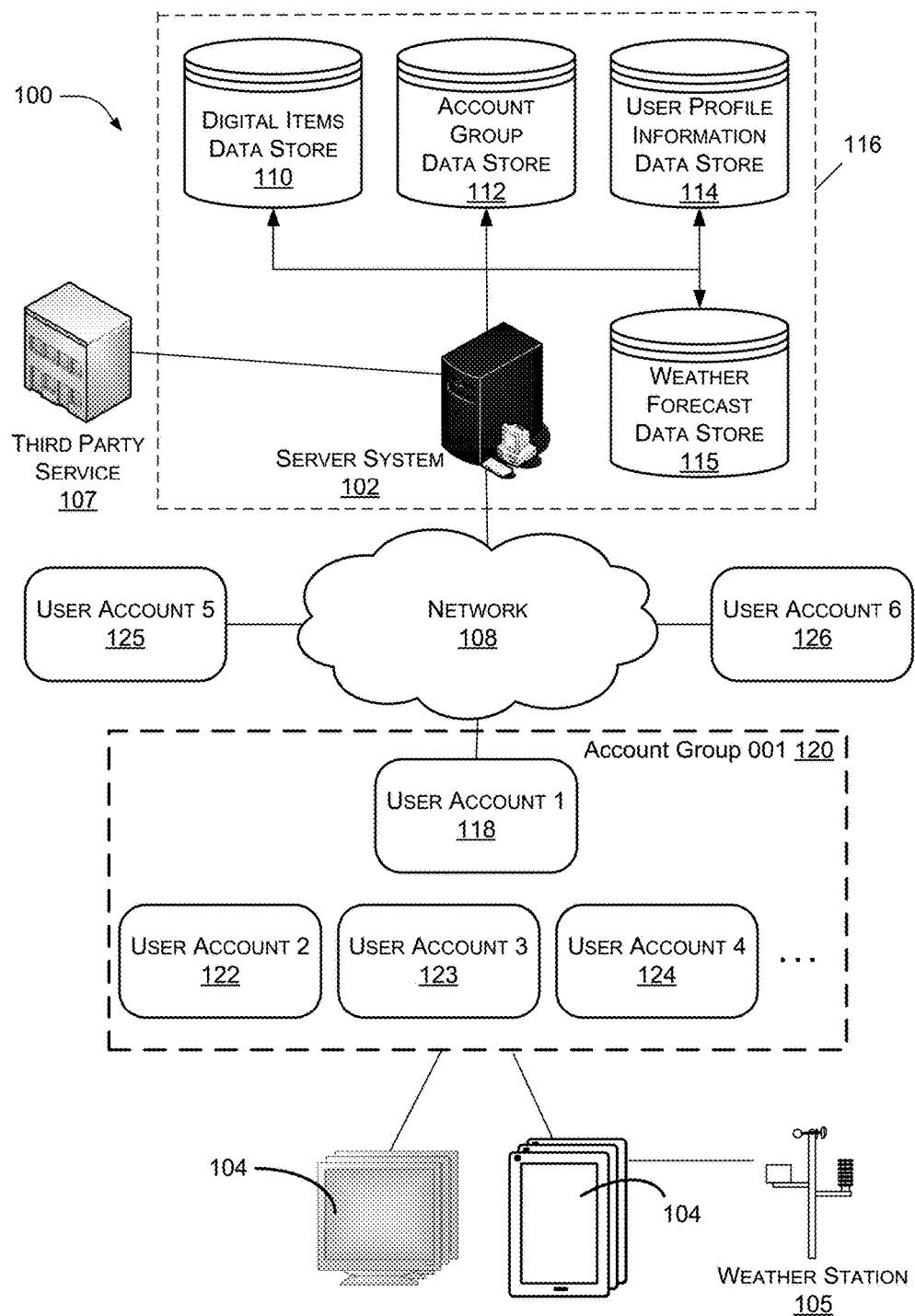
FIG. 1 is a pictorial diagram of an example computing environment that includes a server system in communication with an account group having multiple associated account profiles, in accordance with an implementation.

While implementations are described herein by way of example, those skilled in the art will recognize that the implementations are not limited to the examples or drawings described. It should be understood that the drawings and detailed description thereto are not intended to limit implementations to the particular form disclosed but, on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

DETAILED DESCRIPTION

This disclosure describes an account management service that allows for the creation and management of primary and secondary user accounts and account profiles. As described herein, a primary account user, such as a mom, dad, teacher, etc., may establish an account group and establish one or more secondary account profiles that may be associated with other user accounts and provide access to the account group. Through the account group, the primary account user can determine what digital items to share with users of secondary account profiles, how and how frequently digital items and/or devices can be accessed or used by users of secondary accounts, etc. The primary account user may also establish weather constraints, goals and/or achievements for one or more of the secondary accounts. For example, a primary account user may specify that, when the weather outside is good (e.g., calm, clear and between sixty-five degrees Fahrenheit and eighty-five degrees Fahrenheit), access to digital items may be restricted to encourage the user of the secondary account to go outside. In some implementations, the primary account user may specify a desired time outside during which access to digital items is restricted to encourage the secondary account user to be outside and/or may provide rewards (e.g., additional time to play games) if the secondary account user is outside for a specified amount of time.

Still further, the implementations described herein may utilize components (e.g., ambient light sensor, location determining sensor, Wi-Fi connectivity) to determine whether the user is outside with the device. In some implementations, additional components (e.g., pedometer or other wearable) or devices may be used to determine if the user is outside. Likewise, the secondary account user, primary account user and/or an extended account user (discussed below) may indicate whether the secondary account user has been outside for a specified period of time.

In addition to specifying weather constraints for restricting access to digital items, in some implementations, the user may specify whether all digital items are to be restricted, or only specific digital items (or types of digital items). For example, the primary account user may specify that access to all non-educational digital items is to be restricted during specified weather conditions, but access to educational content is to be allowed. In some implementations, access to digital items by a secondary account user may be restricted on all devices or, alternatively, only specified devices.

While the discussions provided herein focus primarily on a primary account users restricting access to digital items by a secondary account user, in other implementations, a primary account user and/or a secondary account user may specify weather constraints for restricting access to digital items with respect to their own account. For example, a primary account user may specify weather conditions that, when satisfied, are to restrict access to digital items by the primary account user.

As will be discussed herein, account groups and the rights associated with each of the secondary account profiles may be utilized across multiple different devices as well as across multiple different digital item types. For example, any time a user associated with one of the secondary account profiles accesses a device that is also associated with the account group, the appropriate secondary account profile may be utilized. For example, regardless of whether Steve, a secondary account user, attempts to access digital items using an electronic book, television, laptop, or other digital device, the secondary account profile rights associated with Steve may be applied to those devices such that Steve is only provided with access to digital items when he has been outside for the specified amount of time and/or the weather constraints are not satisfied.

FIG. 1 is a pictorial diagram of an illustrative computing environment 100 that includes a server system 102 and a number of client devices 104. Although one server system 102 and two client devices are shown in FIG. 1, the computing environment 100 may include any number of server systems and client devices. The network 108 may include a local area network, a wide area network, such as a public switched telephone network (PSTN), a cable television network, a satellite network, a collection of networks, a public Internet Protocol (IP) network, a private IP network, or a combination thereof. Moreover, the network 108 may be wired, wireless, or a combination of the two. The computing environment 100 also includes a digital items data store 110, an account group data store 112, a user profile information data store 114, and a weather forecast data store 115. The digital items data store 110, the account group data store 112, the user profile information data store 114, and the weather forecast data store 115 may be integrated with the server system 102 or otherwise communicatively coupled with the server system 102. In some implementations, the digital items data store 110, the account group data store 112, the user profile information data store 114 and/or the weather forecast data store 115 may include one or more CD-RW/DVD-RW drives, hard disk drives, tape drives, or other storage devices that are utilized to store digital content and information. The server system 102, separately or together with the digital items data store 110, the account group data store 112, the user profile information data store 114 and/or the weather forecast data store 115 may provide an account management service 116 that facilitates primary and secondary account group formation, interaction, management, and access to digital items.

Client devices 104 may be any type of digital device, such as, but not limited to, a personal computer, a tablet computer, an eBook reader device, a laptop computer, a netbook, a personal digital assistant (PDA), a portable gaming device, a wireless communication device, such as a smart phone or mobile handset, a set-top-box, a game console, a portable music player, a television, or any combination thereof. In addition to communicating with the server system 102 via the network 108, client devices 104 may communicate via peer-to-peer wired or wireless connections or any other form of network connection. As will be described with regard to the particular implementations shown herein, the server system 102 is configured to exchange data and information, including digital items, account group rights, specific account rights, criteria, account and account profiles, overview information, weather, weather constraints and/or other like information among the client devices 104. In some circumstances, the server system 102 may be associated with a merchant, such as an online retailer, authorized to sell, share or otherwise make available to users digital items and/or other content, such as books, compact discs, digital video discs, and Blu-ray discs, etc., to users. However, in other examples, the server system 102 may be associated with a site facilitating sale or distribution of items by other sellers, a social networking site, an academic or educational site, or any other online site.

While the implementations discussed herein refer to a server system 102 associated with an external source, in some implementations, the server system 102 may interact with multiple external sources. In such an implementation, account groups may be maintained and implemented for digital items provided by any number of external sources.

The digital items data store 110 stores electronic media files comprising a plurality of digital items that may be accessible to the client devices 104 via the network 108. For example, the account management service 116 may provide, sell, lease, share or otherwise make digital items available to users via one or more client devices 104. A "digital item," as used herein, may include any type of content that can be stored and distributed in digital form. For example, digital items include, without limitation, text content, text formatting, image content, audio content, video content, hypertext protocol content, and so on, or any combination of these kinds of content. Some specific examples of digital items include, without limitation, all forms of textual information, such as books, magazines, newspapers, newsletters, periodicals, journals, reference materials, telephone books, textbooks, anthologies, proceedings of meetings, forms, directories, maps, manuals, guides, references, articles, reports, documents, etc., (generally referred to herein as e-books), all forms of audio and audiovisual works, such as music, multimedia presentations, audio books, movies, still images, pictures, photographs, or any combination thereof, and all forms of digital applications, such as games, programs, and the like. Additionally, "digital item" may refer to a portion of a larger work, such as a chapter of a book, or a song of an album, etc. Further, a digital item may refer to a larger compilation of component digital items which are related in any manner. For instance, a digital item may refer to multiple issues of a magazine in a particular year.

The digital items data store 110 may also store additional information (e.g., metadata) about digital items. For example, some digital items may include digital rights management, concurrent device use restrictions, content category, activity type, etc. Other forms of additional information include the title of the digital item, the size of the digital item, genre, length, etc. Any form of information about the digital item may be maintained in the digital items data store 110. As discussed herein, additional information about and/or associated with digital items may be used to determine what and what types of digital items are accessible to users. For example, a content category associated with a digital item may be used to identify digital items that can be accessed by a user to achieve a goal. Likewise, activity types associated with digital items may be used to identify which digital items are accessible to a user.

The account group data store 112 stores information specifying accounts and account profiles that are part of an account group. A primary account user, such as a user of user account 1 118, may establish an account group 001 120 that includes the user account 1 118, user account 2 122, user account 3 123, user account 4 124 and/or any number of other user accounts. The information regarding the account group 001 120 may be shared with the server system 102 and stored in the account group data store 112. In some implementations, secondary account profiles may be created and associated with each user account, other than the primary account that is associated with the account group, and such information maintained in the account group data store 112. In some implementations, a primary account profile may also be established and associated with the primary user account.

Account group information and/or the secondary account profiles may include information identifying the corresponding user accounts, account group rights, specific account rights, account rules, weather constraints, etc. In some implementations, as discussed below, other user accounts that are not part of the account group may also be associated with the account group so that they can provide digital items to the account group (referred to herein as extended account profiles).

The account group data store 112 may also include an identification of the digital items that are associated with or otherwise available to users within the account group, attributes about users within the account, such as age, relationship, residence, profession, educational level, gender, etc. Such information may be used to determine what digital items are to be made available to the respective accounts. Access or other permissions may also be maintained in the account group data store 112. For example, a primary account user may specify whether users of one or more of the secondary accounts can specify specific account rights and/or rules for other secondary account profiles. Likewise, a primary user may temporarily enable a secondary account profile, and/or an external account profile, such that it can control access to digital items by other secondary account profiles. For example, Ann, the primary account user, may temporarily enable the external account associated with the user Darla (the babysitter), with the ability to control access to digital items by other secondary account profiles.

The account group data store 112 may also include information specifying weather constraints that are associated with the account profiles. For example, the primary account user, or another authorized account user, may specify one or more forecast periods and corresponding weather conditions that, if met during the forecast period, will cause the client devices to restrict access to all or some of the digital items associated with a user account until the user has been outside for a specified period of time and/or until the specified weather conditions are no longer satisfied. For example, a primary account user may specify that if the weather between 8:00 am and 8:00 pm on Saturday or Sunday is sunny and the temperature is between sixty-five degrees Fahrenheit and eighty degrees Fahrenheit, access to all digital items by the secondary account user is to be restricted until the secondary account user has been outside for a total of at least five hours. The weather conditions may be determined based on sensors located on one or more devices associated with the account profile, based on a personal weather station, based on weather forecasts provided by a third party, based on weather information maintained in the weather forecast data store 115, etc. For example, the client device 104 may communicate with a weather station 105 (e.g., home weather station) to determine the current weather conditions at the location of the secondary account user and apply the weather constraints specified by the primary account user based on those determined weather conditions. Alternatively, or in addition thereto, the server system 102 may obtain weather forecasts representative of the weather at the location of the secondary account user from a third party weather service 107 and determine whether to apply the weather constraints to the secondary account user profile.

It may be determined whether the secondary account user has been outside for the specified amount of time using, for example, sensors on one or more of the client devices, based on input provided by the secondary account user, primary account user and/or an extended account user, and/or based on information from other devices/components associated with the secondary account user. For example, if one of the client devices 104 associated with the secondary account user is a portable smart phone that includes a global positioning system (gps) receiver, an ambient light sensor, temperature sensor, accelerometer, etc., the inputs from those sensors may be provided to the server system 102 to determine if the secondary account user is outside with the client device. Likewise, the secondary account user may specify the amount of time they have been outside. In some implementations, secondary account user submitted information may be provided to and verified by the primary account user prior to being accepted by the server system 102.

In some implementations, user accounts 5 125, 6 126 that are not part of the account group 001 120 may be associated with the account group 001 120 through the creation of extended account profiles. Extended account profiles may also be maintained in the account group data store 112 along with any restrictions that may be associated with the extended account profile. For example, the primary account user may specify that the user of the extended account profile can gift money or credit to secondary account users but may restrict or deny the user of the extended account from giving specific digital items to a user of a secondary account profile within the account group.

The user profile information data store 114 stores data relating to user accounts, account profiles, users of client devices, such as users of client devices 104, and the like. User profile information may be entered by users of the client devices 104 when using the client device and/or may be provided by the primary account 1 118 user when establishing the account group 001 120, secondary account profiles and/or extended account profiles. The information stored in the user information data store 114 may include attributes, such as age, occupation, geographic location, location of residence, account group memberships, interests, educational level, hobbies, previous digital items purchased via the account management service 116, such as digital items downloaded from the digital items data store, goals, time constraints, weather constraints, achievements, other personal information, or a combination thereof.

The weather forecast data store 115 may maintain current, historical and/or forecasted weather conditions for different locations. For example, the account management service 116 may periodically receive weather forecast information from a third party service 107, such as ACCUWEATHER, store that information in the weather forecast data store 115 and provide weather forecast information to client devices 104 corresponding to the location of the client devices 104. In some implementations, client devices 104 may provide current and/or forecasted weather information to the account management service 116 and that information may be maintained in the weather forecast data store 115 and/or provided to other client devices 104. For example, a first client device 104 may obtain weather forecast information from a weather station 105 (e.g., home weather station) and provide that information to the account management service 116. A second client device located in the same geographic area as the first client device 104 may request weather information from the account management service 116. The account management service, determining that the first client device and the second client device are in the same geographic area, may provide to the second client device the weather information received from the first client device.

In some implementations, some or all of the user information and/or account profiles (e.g., primary account profiles, secondary account profiles, extended account profiles) may be stored on respective client devices 104. Maintaining such information on the client devices 104 provides the ability for users to utilize the client devices 104 and the account group profiles even if access to the server system 102 is not available.

Figure 2:
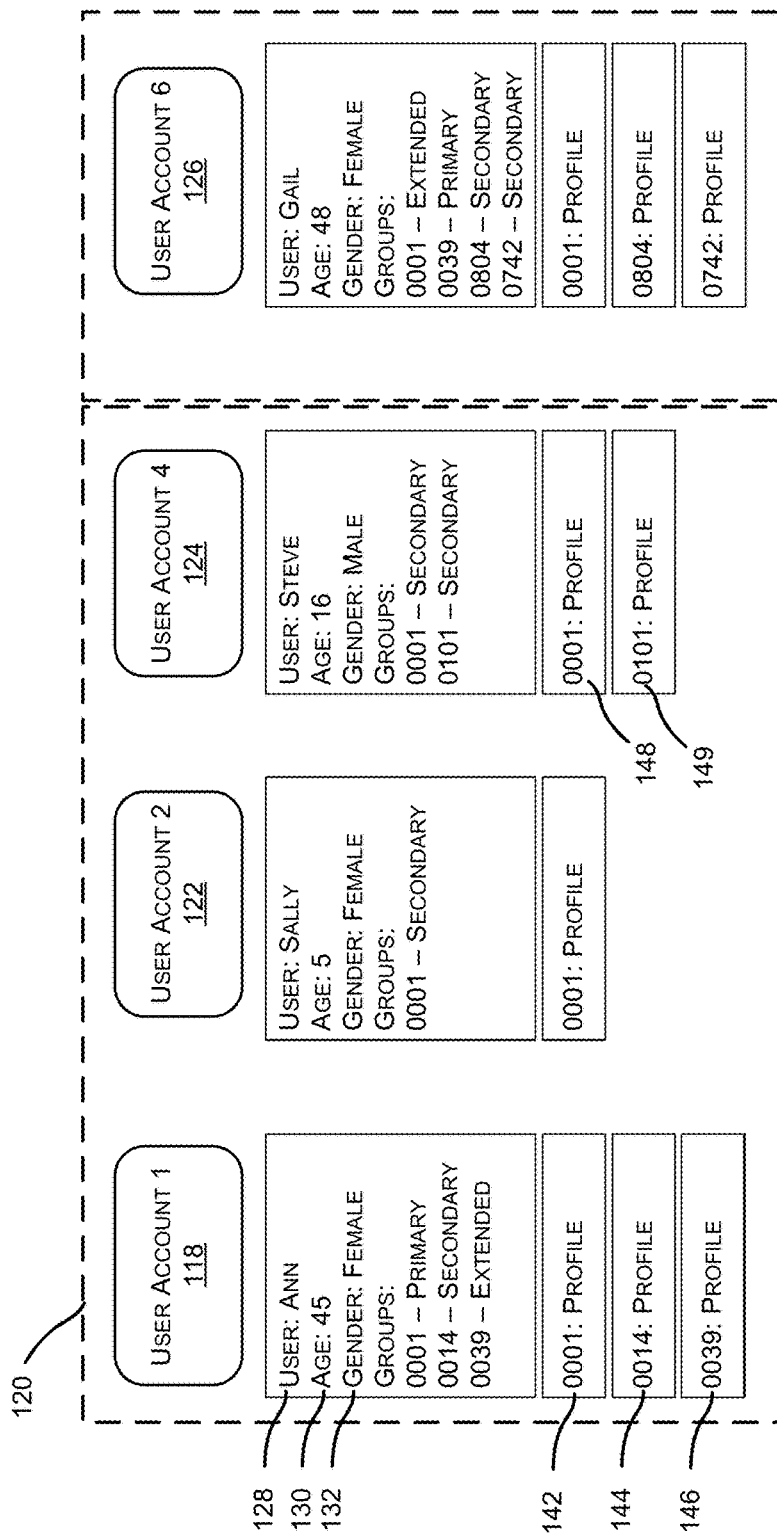
FIG. 2 is a pictorial diagram of an example account group having multiple associated user accounts and profiles, in accordance with an implementation.

FIG. 2 is a pictorial diagram of an example account group 120 having multiple associated user accounts with secondary account profiles, in accordance with an implementation. In this example, the account group 120 has one primary account. In other implementations, an account group may have multiple primary accounts. The primary account in this example is responsible for establishing secondary account profiles, extended account profiles, group rights and any account specific rights.

As noted above, each of the user accounts may include information about the user of that account. For example, user account 1 118, which is the primary account of the account group 120, includes information about the user associated with user account 1 118. In this example, it includes information such as the user's name 128, age 130, gender 132, as well as an identification of the other account groups with which the user account 1 118 is associated.

A user account may be associated with multiple account groups and digital items may be provided to a user of the account based upon a determination of which account group profile should be active. For example, user account 1 118 is associated with three different account groups and, for each account group, there is a different account profile for user account 1. For example, in account group 0001, the account profile 142 identifies that user account 1 118, is the primary account. In account group 0014, user account 1 118 is a secondary account, as illustrated by the secondary account profile 144. For account group 0039, user account 1 118 is an extended account profile, as illustrated by the extended account profile 146.

For each account group with which a user account is associated, an account group profile may be established that includes group rights for the account group as well as any specific account rights and/or weather constraints specified by the primary account user that established the corresponding account group. By maintaining account profiles for each of the different account groups with which a user account is associated, a user only needs one user account and may seamlessly switch between account groups and corresponding rights, restrictions, goals, etc., without having to switch user accounts. For example, when the user of user account 4 124, Steve, is at home, the client device may determine his location and automatically activate account group 0001 utilizing the corresponding account group profile 148. In comparison, when the client device detects that Steve is at school, it may automatically activate account group 0101 utilizing the corresponding account profile 149. In this example, account group 0101 is an account group for one of Steve's classes that was established by his teacher so that the students would have access to the digital items associated with that class. For each account group, the user (in this example Steve) may have access to different digital items, different time constraints, different goals, different weather constraints, etc.

While the above example describes maintaining an account profile for each account group, in some implementations, for user accounts from which an account group is created (i.e., a primary account), a profile may not be needed. Likewise, in some implementations, the profile, such as secondary account profile 144, may include the specific account group rights, rules and/or weather constraints for the user. In other implementations, the profiles may only maintain a reference to the corresponding account group.

Continuing with the example described with respect to FIG. 1, Ann, the primary account user, has established her user account as the primary account and created the account group 001 120 and associated user account 2 122 and user account 4 124 with that account group 120. In this example, as Ann was creating the secondary account profiles for Sally and Steve, because Sally is only five, she did not already have a user account and so Ann created one for her during the process of associating her with the account group 120. In comparison, Steve, the teenager, already had a user account 4 124 and so Ann only needed to establish a secondary account profile 144 that was then associated with Steve's existing account.

As part of creating the account group 120, the primary account user may also identify the client devices 104 that are to be subject to and enforce the rights and rules of the account group 120. Likewise, the primary account user may also invite other user accounts to participate in the account group by sharing, paying for, gifting, or otherwise providing digital items to users of the account group 120. For example, Ann may at the time of creating the account group, or at any later point in time, invite her sister Gail to participate in the account group 120. However, because Gail is not part of Ann's immediate family and therefore may not be part of the account group 120, she may be invited to participate as an extended account so that Gail can gift, provide or otherwise make content available to users within the account group 120, as illustrated by user account 6 126. In some implementations, Ann may allow an extended account profile, such as Gail's (or a secondary account profile), to monitor or otherwise control one or more of the secondary account profiles of the account group and/or provide information as to whether and how long a user was outside. For example, if Ann will be away for the day and Gail will be watching Ann's children, Ann can temporarily enable Gail's account to monitor and/or control access to digital content by the secondary accounts of the account group. Likewise, if access to digital items is restricted to encourage the secondary account users to go outside, the extended account may be authorized to submit the amount of time each secondary account user was outside that counts toward satisfying the goal of being outside.

Likewise, the primary account user that established the account group 120 may also put restrictions or rules specifying what actions users of extended account profiles may do with respect to the account group 120 and the users within the account group 120. For example, Ann may allow her sister Gail to make recurring gifts to any member within the account group 120 but may restrict Gail from providing gifts of specific digital items. To illustrate, she may allow Gail to specify a type of digital item which users within the account group may purchase but may not allow Gail to identify a specific digital item. For example, Gail may be interested in paying for digital items related to mountain climbing and is willing to pay for those digital items when accessed by users within the account group 120. As such, Gail may provide a gift that allows users of the account group to purchase digital items related to mountain climbing. However, Gail may not be allowed to identify specific items for selection by users of the account group 120.

Likewise, Gail, a user of an extended account profile, may specify rules around what she is willing to provide. For example, Gail may make a one-time gift or contribution to the account group 120, may make a recurring gift or contribution to the account group 120, limit what types of digital items may be accessed and charged to her external account profile, limit the amount of charging that can be made to her external account profile, etc.

Figure 3:
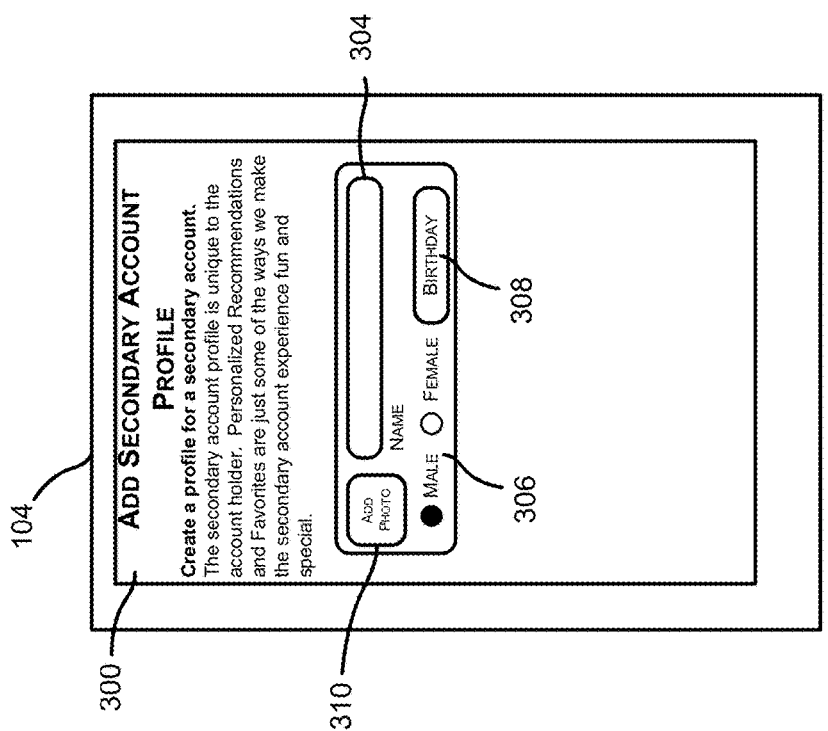
FIG. 3 is a pictorial diagram of an example user interface for adding secondary account profiles, in accordance with an implementation.

FIG. 3 is a pictorial diagram of an example user interface for adding a secondary account profile, in accordance with an implementation. A primary account user, in establishing an account group, may select to create one or more secondary account profiles for users. Utilizing any client device 104, a primary account user may create a secondary account profile for the account group 120 that becomes associated with the primary account. As a starting point, the user may provide a name using the name input control 304 for the secondary account profile. Likewise, the primary account user may provide attributes for the user with which the secondary account profile is to be associated. For example, the gender 306, as well as the birthday 308, may be provided as part of the process of creating a secondary account profile. The primary account user may also provide a photo or other image 310 for use in identifying the secondary account profile. In some implementations, the user interface 300 illustrated in FIG. 3 may include additional information that is used to create a secondary account profile. For example, if the user for which the secondary account profile is being established already has a user account with the account management service 116, the primary account user may provide an identifier, such as an e-mail address, that will identify the user's already existing account. In such an instance, the secondary account profile, when created, will be associated with the primary account, the existing user account, as well as the client devices 104 identified by the primary account user.

Once information for a secondary account profile has been provided by the primary account user and associated with the account group 120, the account management service 116 may create the secondary account profile. In some implementations, digital items may automatically be associated with and made available to the user of the secondary account profile in accordance with group rights, and/or rules provided by the primary account user in creating the account group. In other implementations, the primary account user may edit secondary account profile details and/or view the digital items that are available to a user of the secondary account profile.

Figure 4:
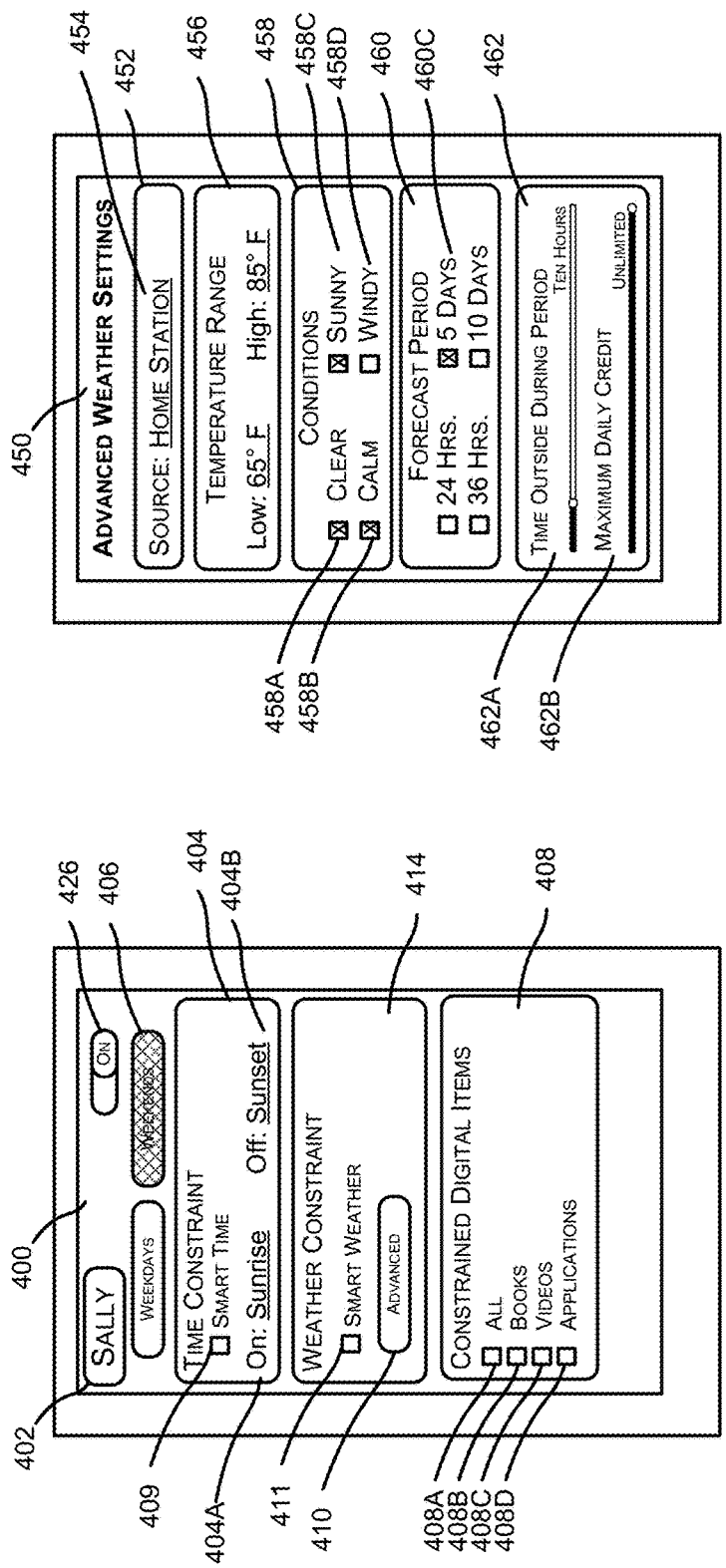
FIGS. 4A-4B are pictorial diagrams for setting weather constraints, in accordance with an implementation.

FIG. 4A is a pictorial diagram of an example user interface 400 for setting weather constraints for accessing digital items, in accordance with an implementation. As illustrated in FIG. 4A, a user may select a secondary account profile, such as "Sally" 402 and specify one or more weather constraints 414 that when satisfied will result in access to some or all digital items being restricted. In one implementation, the primary account user may simply select the "Smart Time" 409 and the "Smart Weather" 411 controls to activate time and weather constraints for the user. Selecting Smart Time 409 will utilize time constraints specified by the account management service 116. For example, the account management service may specify the most preferred times for enabling weather constraints for accessing digital items. In other implementations, the account management service 116 may obtain information from the weather forecast data store relating to sunrise and/or sundown times at the location of the user and select enablement times based on that information.

Selecting Smart Weather 411 will utilize weather constraints specified by the account management service 116. For example, the account management service 116 may specify the most preferred weather conditions or a range of weather conditions as weather constraints. For example, the account management service 116 may consider factors such as the user's age, location, time of year, weather forecast over a period of time (e.g., 5 days, 10 days), user's historical digital access patterns, etc., to determine preferred weather constraints that are used as weather constraints. For example, if the user associated with the secondary account profile is a teenager located in the Pacific Northwest and it is June, the account management service 116 may determine the enablement time to be the time of day being between 9:00 am and 9:00 pm, and determine the preferred weather conditions as the temperature being fifty-five degrees or higher and it is not raining. If the enablement time and the preferred weather conditions are satisfied, the weather constraint may be enabled prohibiting access to digital items by the secondary account user.

In some implementations, the primary account user may specify the days or day of the week for which weather constraints are to be considered. For example, the primary account user may specify specific times during the day, a specific day or days, a recurring day or days (e.g., Weekdays, Monday, Monday-Thursday), and/or any combination thereof for which weather constraints are to be enabled. In this example, the primary account user has selected the radio button "Weekends" 406, which corresponds to Saturdays and Sundays. Likewise, rather than selecting Smart Time 409, the user has specified that weather constraints are to be enabled between sunrise and sunset in the time constraint window 404. In this example, if the primary account user selects the On time 404A or the Off time 404B, the primary account user may modify the start and/or stop time by interacting with the user interface 400. Likewise, the primary account user may activate or deactivate the weather constraints using the On/Off radio control 426. While this example illustrates enabling the weather constraints between sunrise and sunset, the user may alternatively specify specific times (e.g., 9:00 am-9:00 pm). Likewise, in some implementations, the user may be able to specify the enablement time as a difference from, for example, sunrise and sunset. For example, the user may specify that the weather constraints should be enabled one hour after sunrise and disabled one hour before sunset.

In addition to setting time constraints 404 for Weekends 406, the primary account user may specify the types of digital items for which access is to be restricted if the weather constraints are satisfied, using the constrained digital items interface 408. For example, the user may select to prohibit access to all digital items 408A, books 408B, videos 408C and/or applications 408D. In some implementations, the user may be provided with additional or fewer digital item choices. For example, in some implementations, the user may specify whether access to educational digital items is to be restricted.

In some implementations, the primary account user may specify additional information and/or specify particular weather constraints by selecting the advanced control 410. Upon selection of the advanced control 410, the Advanced Weather Settings user interface 450 is provided, as illustrated in FIG. 4B. In the Advanced Weather Settings user interface 450, the primary account user may specify the source of the weather forecast and/or weather conditions, via the source control 452. In this example, the primary account user has selected to use a home station 454 for receiving the weather conditions and/or weather forecast. As discussed above, weather conditions and/or weather forecasts may be provided by the account management service 116, a third party in communication with the account management service, from a client device and/or from another source. For example, the home station 454 may be a personal weather station located at the user's home that can provide current weather conditions and/or weather forecasts to the client device 104 and/or the account management service 116.

The primary account user may also specify a temperature and/or temperature range for the weather constraint using the Temperature Range control 456. The temperature range control 456 may be utilized to specify any range of temperature that, if the current weather condition is within that range, the weather constraint is to be implemented and access to digital items restricted. In other implementations, as discussed below, the temperature range may be a factor in determining whether to implement a weather constraint and restrict access to digital items.

In addition to temperature range, the primary account user may also specify a forecast period 458 for which the weather constraints are to be considered. Any number of weather conditions may be specified and/or selected. In the presented example, the primary account user may select from the weather conditions of Clear 458A, Calm 458B, Sunny 458C, Windy 458D. In this example, the primary account user has selected Clear 458A, Calm 458B and Sunny 458C as preferred weather conditions. If any or all of these preferred weather conditions are satisfied, along with any other weather factors (e.g., temperature range), the weather constraints may be satisfied and access to digital items restricted. In other implementations, fewer and/or additional weather conditions (also referred to herein generally as weather factors) may be presented for selection. Likewise, a primary account user may specify whether any or all of the selected weather factors are necessary for enablement of the weather constraints.

The primary account user may also specify a forecast period via the forecast period controls 460 that is to be considered when determining whether to enable the weather constraints and prohibit access to digital items. Likewise, the user may specify a desired time outside during the forecast period and/or a maximum daily credit for time outside, using the outside controls 462. In this example, the primary account user has specified a forecast period of five days 460C, that the secondary account user should be outside for at least ten hours 462A during the five day forecast period and that there is no maximum daily credit 462B for time outside.

In such an implementation, rather than determining if the current weather conditions satisfy the specified weather factors and restricting access to digital items, the weather forecast over the forecast period may be considered and a determination made as to which times during the forecast period the weather constraints should be enabled to encourage the secondary account user to be outside. For example, during the forecast period of five days, there is a total of sixty hours between 8:00 am and 8:00 pm each day. Rather than enabling the weather constraints at any time the specified weather factors are satisfied, the account management service 116 may consider the forecast during the forecast period, the specified weather factors, the time the user has already spent outside, the time remaining in the forecast period, etc., and determine which periods of time during the forecast period to enable the time constraints and restrict access to digital items. For example, even though the temperature range may be satisfied when the temperature is between sixty-five degrees and eighty-five degrees, there may be a preference when the temperature is near the median of the temperature range. Likewise, there may be a preference when more than one of the weather conditions 458 are satisfied. In such an implementation, the weather forecast during the forecast period may be considered and a weather score generated for sample periods of time (e.g., one-hour sample periods) during the remaining forecast period. In computing the weather condition scores, different weighting multiples may be associated with different weather factors. For example, any weather factor that is outside a specified range during the sample period may be given a weighting multiple of zero. Each satisfied weather condition may be given a multiple of one, temperatures within one standard deviation from the median of a specified temperature range may be given a multiple of one, temperatures between one standard deviation and two standard deviations of the median temperature may be given a weighting multiple of 0.5 and temperatures beyond two standard deviations of the median, but within the specified temperature range, may be given a weighting multiple of 0.25. Each of the weather factors for each sample period may be summed and the sample periods with the highest weather condition score may be selected as the times during which the weather constraints are enabled and access to digital items is restricted.

It will be appreciated that other factors and/or other techniques for computing a weather condition score may be utilized with the implementations discussed herein. For example, additional factors, which may or may not be weighted, may include, but are not limited to, planned activities of the secondary account user (e.g., soccer game, swimming, school, travel), day of the week, time remaining in the forecast period, etc.

Figure 5:
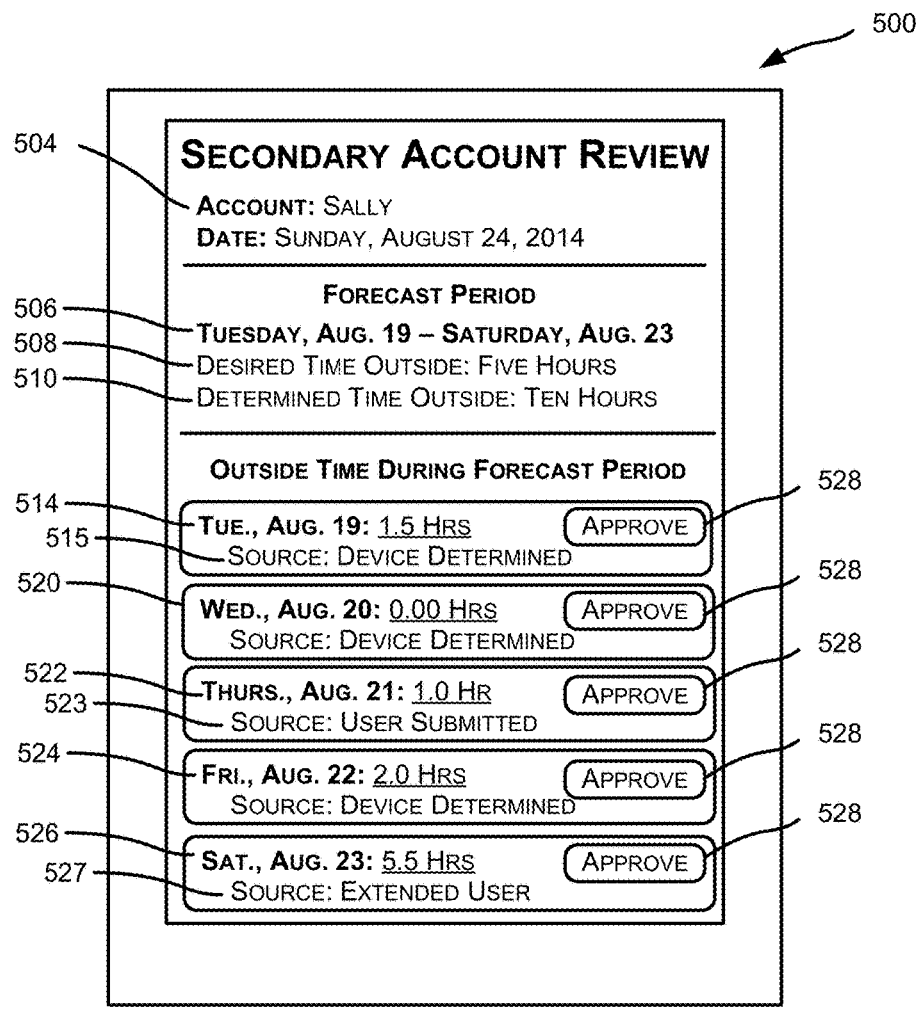
FIG. 5 is a pictorial diagram of an example user interface for providing overview information to a primary account user, in accordance with an implementation.

FIG. 5 is a pictorial diagram of an example user interface 500 for providing overview information to a primary account user, in accordance with an implementation. As illustrated in the user interface 500, overview information relating to time outside by a secondary account user during each day of a forecast period is provided. In this example, the overview information provides time outside by the secondary account user 504 Sally for a five-day forecast period 506. Likewise, for each day, the information identifies the source or basis as to how the time outside was determined. For example, the time outside for the first day 514, Tuesday, August 19, of 1.5 hours, was determined by the device, as illustrated by the source 515. As discussed above, time outside may be determined or received from a client device associated with the secondary account user, an external device (e.g., pedometer, phone) associated with the secondary account user, from the primary account user, from an extended user, etc. For example, the secondary account user may utilize a wearable device, such as a heart rate monitor, pedometer, and/or other form of device that can monitor the activity of the secondary account user.

In this example, the time outside for the second day 520, Wednesday, August 20, of 0.00 hours, was determined by the device; the time outside for the third day 522, Thursday, August 21, of 1.0 hours, was determined by secondary account user submission, as illustrated by source 523; the time outside for the fourth day 524, Friday, August 22, of 2.0 hours, was determined by the device; and the time outside for the fifth day 526, Saturday, August 23, of 5.5 hours, was submitted by an extended user, as illustrated by source 527.

In some implementations, the primary account user may approve the determined time outside by selecting the corresponding approve control 528. To obtain additional information about the determined time outside, the user may select the portion of the interface 500 for the day of interest and obtain additional information (not shown). For example, the user may select the portion of interface 500 corresponding to the first day 514 and obtain additional information about the determined time outside. Additional information may include, but is not limited to, the time of day when the time outside occurred, the location of the secondary account user, the client device that determined the time outside, the sensors utilized to determine the time outside, etc. Likewise, the primary account user may increase, decrease, decline and/or approve the amount of the determined time outside.

In this example, the primary account user established weather constraints with a desired time outside 508 during the forecast period of five hours. Based on the determined time outside 510, the secondary account user has spent ten hours outside. If the primary account user approves the determined time outside, the secondary account user will have exceeded the desired time outside by five hours during the forecast period. In some implementations, if the secondary account user meets or exceeds the desired time outside, the primary account user may specify a reward or other achievement. For example, the primary account user may specify that the secondary account user may be allowed to access an application (e.g., game) for an extended period of time, purchase a digital item, etc.

Figure 6:
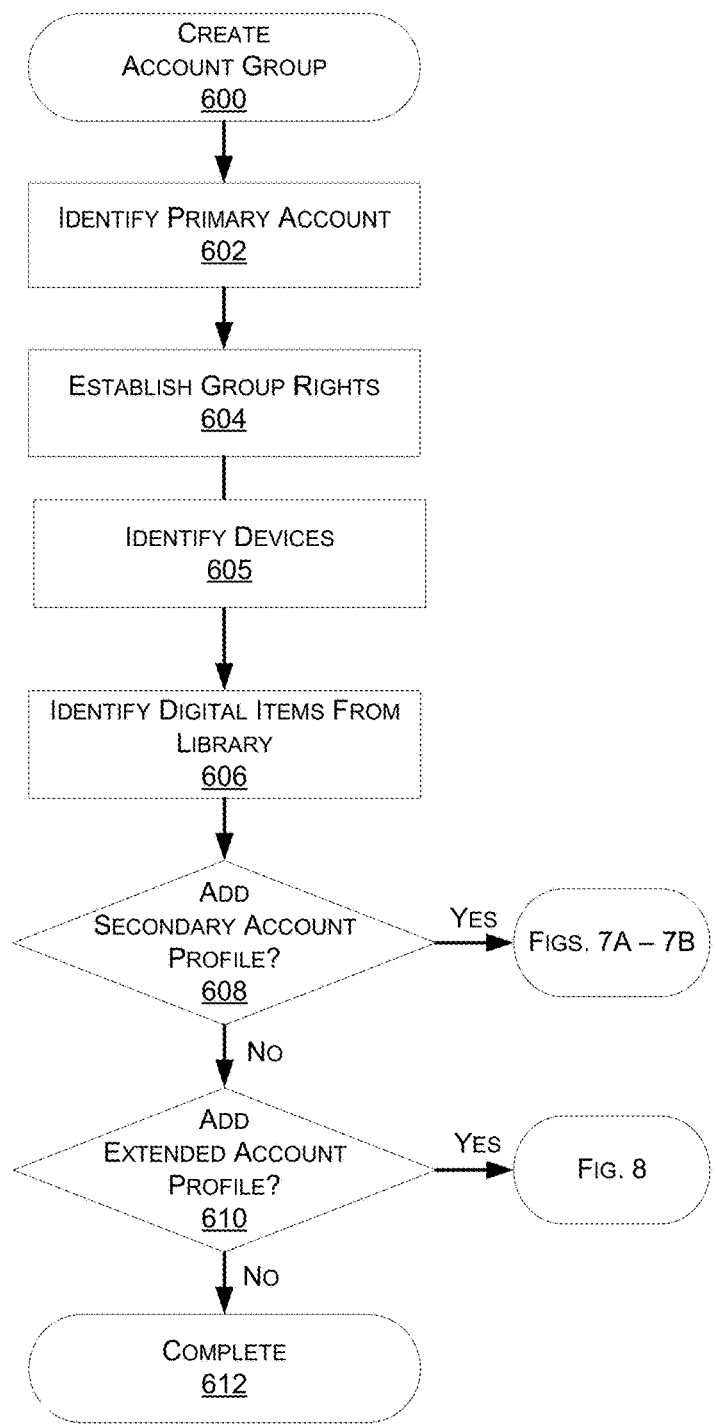
FIG. 6 is a flow diagram of an example routine for creating an account group, in accordance with an implementation.

FIG. 6 is a flow diagram of an example routine for creating an account group, in accordance with an implementation. This process, and each process described herein, may be implemented by the architectures described herein or by other architectures. The process is illustrated as a collection of blocks in a logical flow graph. Some of the blocks represent operations that can be implemented in hardware, software, or a combination thereof. In the context of software, the blocks represent computer-executable instructions stored on one or more computer-readable media that, when executed by one or more processors, perform the recited operations. Generally, computer-executable instructions include routines, programs, objects, components, data structures, and the like that perform particular functions or implement particular abstract data types.

The computer-readable media may include non-transitory computer-readable storage media, which may include hard drives, floppy diskettes, optical disks, CD-ROMs, DVDs, read-only memories (ROMs), random access memories (RAMs), EPROMs, EEPROMs, flash memory, magnetic or optical cards, solid-state memory devices, or other types of storage media suitable for storing electronic instructions. In addition, in some implementations, the computer-readable media may include a transitory computer-readable signal (in compressed or uncompressed form). Examples of computer-readable signals, whether modulated using a carrier or not, include, but are not limited to, signals that a computer system hosting or running a computer program can be configured to access, including signals downloaded or uploaded through the Internet or other networks. Finally, the order in which the operations are described is not intended to be construed as a limitation, and any number of the described operations can be combined in any order and/or in parallel to implement the process.

The create account group routine 600 begins by a primary account user identifying an account and requesting to establish an account group, as in 602. In some implementations, the primary account may be the only account that is allowed to set group rights, specific account rights, rules and/or weather constraints for the account group. Likewise, in some implementations, an account group may only have one primary account while in other implementations an account group may have multiple primary accounts.

Upon identifying a primary account for the account group, one or more group rights may be established, as in 604. Group rights may be anything that is generally applied to all user accounts and/or account profiles associated with an account group. For example, a group right may specify whether other users associated with secondary account profiles may purchase and/or charge things to the primary account of the account group. Likewise, a group right may specify guidelines in determining digital items that are made available to users associated with secondary account profiles. For example, the primary account user may identify a public or private entity (collectively "external source") that provides guidelines or criteria around what types and/or what digital items are to be made available to secondary account users based on, for example, the secondary account user's age. This may be a public rating system, a private system such as a user's church, city organization, school, neighborhood, small group, etc. Group rights may also include time constraints for each member of the group, goals, achievements, and the like.

In addition to establishing group rights, one or more devices may be associated with the account group, as in 605. For example, a primary account user may identify client devices that are to always implement the account profiles and the corresponding rights, rules and weather constraints when a user associated with one of the corresponding profiles accesses the device. In other implementations, the primary account user may specify that any device through which a user associated with one or more of the profiles attempts to access the server 102 may apply the account group rights, rules and weather constraints. In addition to identifying devices, the example routine 600 may identify digital items from the library of the primary account, as in 606. This may be done automatically based on the group rights specified previously and/or based upon selections provided by a primary account user.

As part of the account group creation process 600, or at any other time after an account group has been created, a determination may be made as to whether a secondary account profile is to be established, as in 608. If it is determined that a secondary account profile is to be established for the account group, the example process described below with respect to FIGS. 7A-7B may be completed and the secondary account profile added to the account group. However, if it is determined that a secondary account profile is not to be added to the account group, a determination may be made as to whether an extended account profile is to be added to the account group, as in 610. If it is determined that an extended account profile is to be added to the account group as part of the account group creation process 600 or at any time after account group creation, the example process described below with respect to FIG. 8 may be completed and the extended account profile associated with the account group. If it is determined that no additional secondary account profiles and/or extended account profiles are to be added to the account group as part of the account group creation process 600, the account group creation process 600 may complete, as in 612.

Figure 7A:
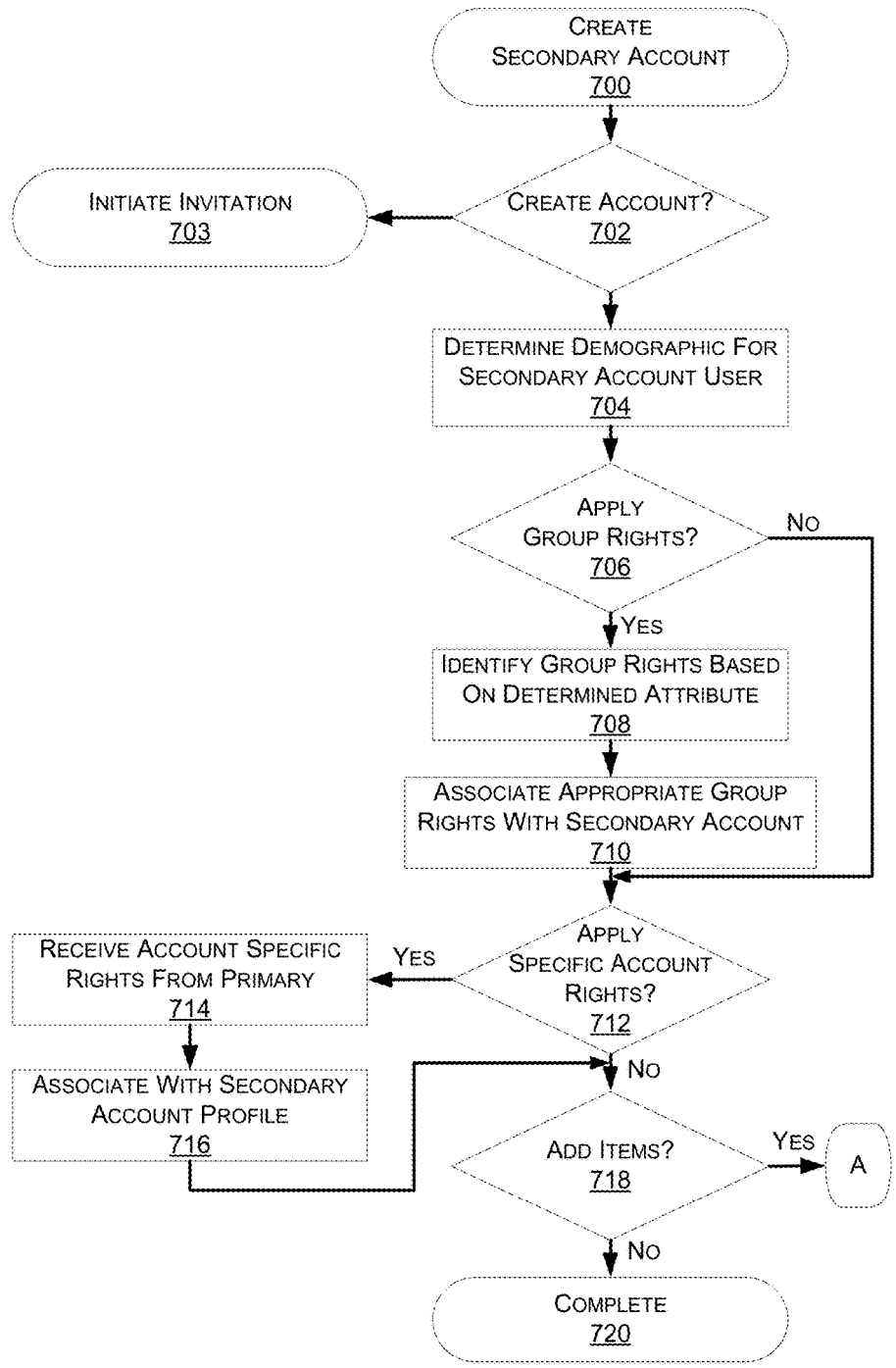
FIGS. 7A-7B are flow diagrams of an example routine for creating a secondary account profile, in accordance with an implementation.
Figure 7B:
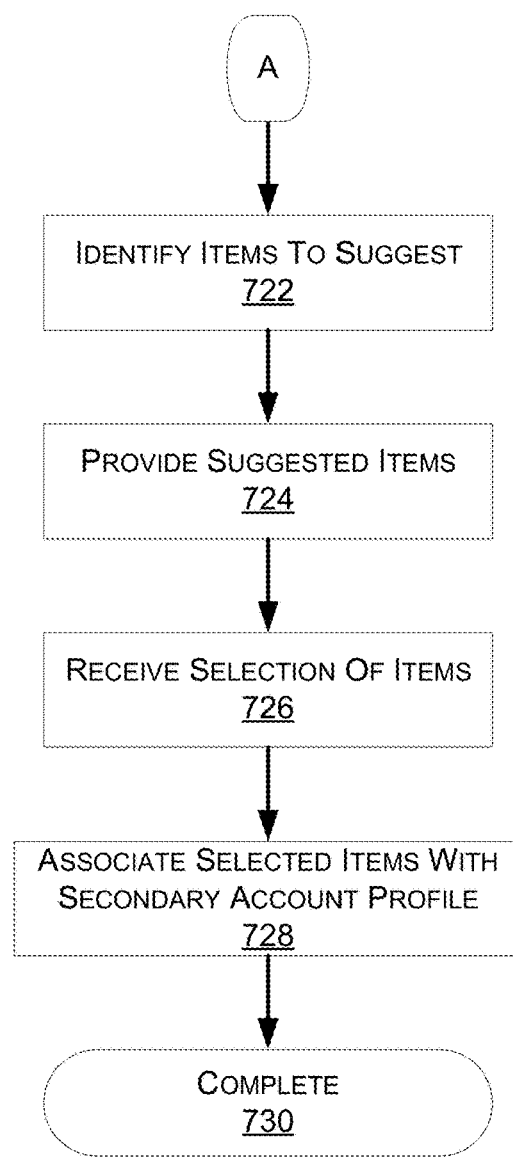

FIGS. 7A-7B is a flow diagram of an example routine 700 for creating a secondary account profile, in accordance with an implementation. The secondary account profile creation routine 700 begins by determining whether to create an account for which a secondary account profile is to be associated, as in 702. In instances when the user for which the secondary account profile is being created does not already have a user account, the primary account user may create a user account for that individual. This is helpful in instances when the user is under a specified age (e.g., 18) and may not be allowed to create their own user account. As part of the example process 700, a determination of attributes, such as the age of the account user for which the secondary account profile is being created, may also be determined, as in 704. Other information about the user for which the secondary account profile is being created may also be determined. In some implementations, an account may not be created and only an account profile established and associated with the primary account.

If it is determined that an account does not need to be created, the example process 700 may initiate an invitation to an existing account to join the account group, as in 703. In this example, if the user of the existing account accepts the invitation, a secondary account profile is associated with the existing user account such that the user of the existing account can access the account group according to the secondary account profile.

Once an account has been created or an invitation to join accepted for an existing account, a determination may be made as to whether one or more group rights exist that are to be applied to the secondary account profile, as in 706. In some implementations, group rights may always be applied to secondary account profiles that are associated with an account group. In other implementations, a primary account user may identify a secondary account profile for which group rights may not be applied. For example, if a secondary account profile is associated with another adult (e.g., a husband of the primary account user), it may be determined that group rights are not to be associated with that secondary account profile.

If it is determined that group rights are to be applied to the secondary account profile, the appropriate group rights may be identified based on one or more attributes known about the user for which the secondary account profile is to be created, as in 708. For example, some or all of the group rights may be age dependent and based on the attribute of the user's age and an appropriate right is associated with the secondary account profile. For example, if a group right identifies that users are only to be provided with videos with a rating that corresponds with their determined age, the example process 700 may utilize the age of the user for which the secondary account profile is to be associated to establish a group right for that specific account such that only videos corresponding with the appropriate age range for that user are accessible to the user. Upon identifying the appropriate group right based on the attribute(s) of the user for which the secondary account profile is being created, the example process 700 may associate those group rights with the secondary account profile, as in 710. In some implementations, the primary account user may specify weather constraints as a group right that is applied to all secondary user accounts.

In addition to associating group rights with the secondary account profile, or if it is determined that group rights are not to be applied to the secondary account profile, a determination may be made as to whether any account specific rights are to be applied to the secondary account, as in 712. As discussed above, an account specific right may be any right, restriction or other rule that is specified by a primary account user that is to be applied to the specific account for which the secondary account profile is being created. For example, a specific account may be a weather constraint, as discussed herein. As another example, an account specific right may be used to determine digital items based on an estimated skill level, maturity level or reading comprehension level of the user of the secondary account profile. In still another example, the rights may include the time constraints, goals, total access time limits, content type access limits, etc., discussed above (e.g., FIGS. 6A-6C).

If it is determined that specific account rights are to be applied to the secondary account profile, those specific account rights are received from the primary account user, as in 714. Any number of specific account rights may be associated with a secondary account profile and those rights may be unique to the secondary account profile or applied to multiple secondary account profiles. As specific account rights are received from the primary account user, those rights may be associated with the secondary account profile, as in 716.

Upon associating the specific account rights received from the primary account user, as in block 716, or if it is determined that no specific account rights are to be applied to the secondary account profile, a determination may be made as to whether digital items are to be added to the secondary account profile by the primary account user, as in 718. If it is determined that digital items are not to be added by the primary account user, the example process 700 may complete, as in 720. However, if it is determined that the primary account user desires to add digital items to the secondary account profile, the example process 700 may identify digital items to suggest to the primary account user, as in 722 (FIG. 7B) and those suggested items may be provided for display to the primary account user, as in 724.

Upon receiving suggested digital items, the user may interact with the service and select one or more digital items to include or block from access by the user of the secondary account profile by providing selections of those digital items, as in 726. Likewise, while not shown in the example process 700, the example process may provide the opportunity for a primary account user to identify one or more criteria that may be used to block or promote digital items to a user of the secondary account profile. Upon receiving selections of digital items to include or remove from access by the user of the secondary account profile, the example process 700 may associate those decisions with the secondary account profile, as in 728. Once the user has completed selecting digital items for inclusion or blocking from access by the user of the secondary account profile, the example process 700 completes, as in 730.

Figure 8:
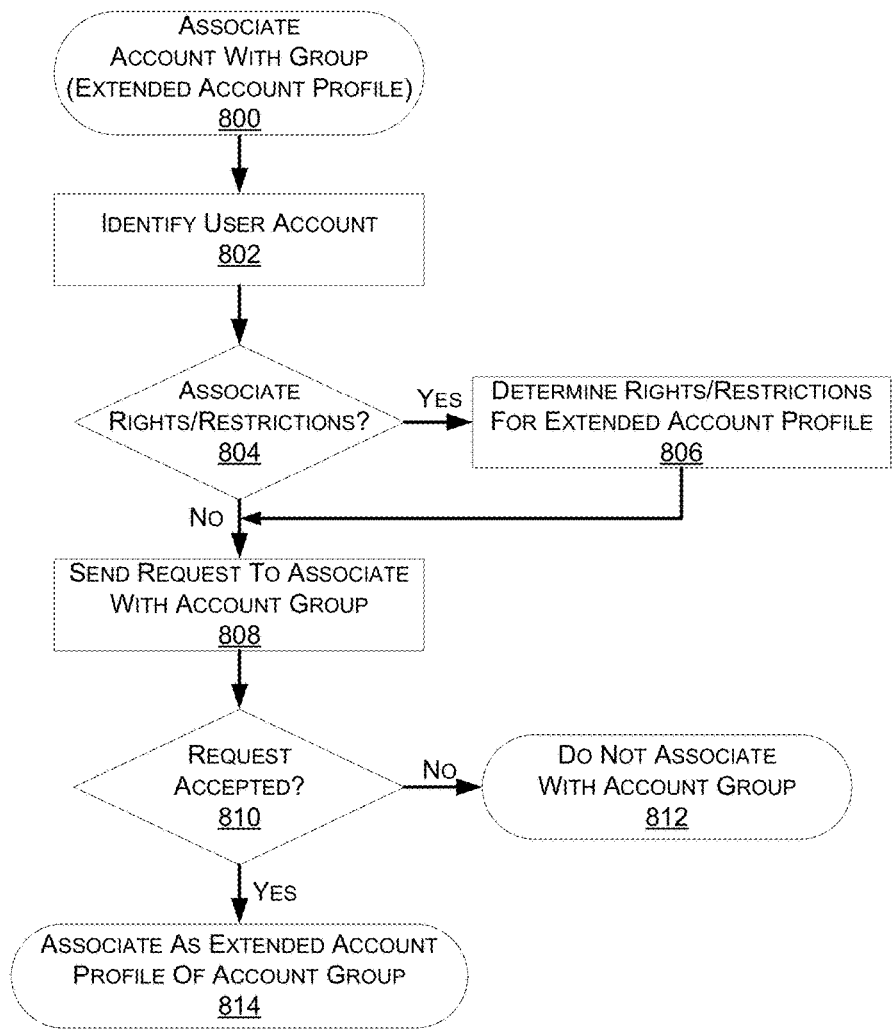
FIG. 8 is a flow diagram of an example routine for associating an account with a group, in accordance with an implementation.

FIG. 8 is a flow diagram of the example routine 800 for associating another user account with an account group (extended account profile), in accordance with an implementation. The process of associating a user account with an account group as an extended account profile begins upon receiving an identification of a user account that is to be added and associated as an extended account profile, as in

802. A determination may then be made as to whether any rights or restrictions are to be associated with that extended account profile, as in 804. If it is determined that one or more rights or restrictions are to be associated with the extended account profile, those restrictions may be determined, as in 806. Restrictions and/or rights to be associated with an extended account profile may be determined by a primary account user specifying specific rights or restrictions for the external account profile or based upon rights or restrictions associated with the account group that are to be applied to all extended account profiles.

Upon determining the restrictions and/or rights for the external account profile or if it is determined that no rights or restrictions are to be applied to the external account profile, a request to associate with the account group may be sent to a user, as in 808. The request may be sent, for example, in the form of an e-mail or other electronic communication that identifies the user account for which the external account profile is to be associated. In other implementations, a user may request to join the account group as an extended account profile rather than the account group sending a request to the user.

A determination may then be made as to whether the request was accepted, as in 810. If it is determined that the request was not accepted, the user account may not be associated with the account group, as in 812. However, if the request is accepted, the user account is associated with the account group as an extended account profile, as in 814.

Figure 9:
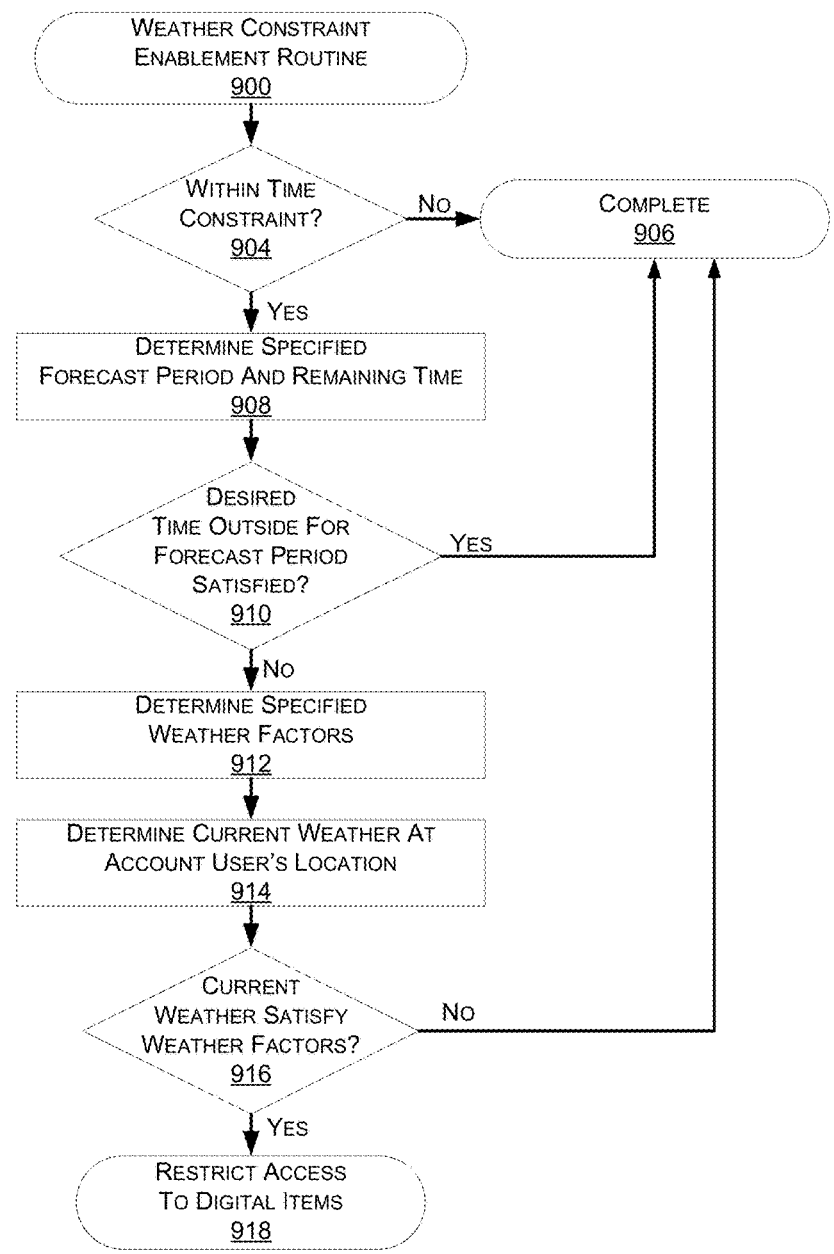
FIG. 9 is a flow diagram of an example weather constraint enablement routine, in accordance with an implementation.

FIG. 9 is a flow diagram of an example weather constraint enablement routine 900, in accordance with an implementation. The weather constraint enablement routine 900 may be applied and used with any account profile, such as a primary account profile, a secondary account profile, etc. This example describes the weather constraint enablement routine with respect to a secondary account profile and a secondary account user.

The example process 900 begins by determining if the current time is within a specified time constraint, as in 904. As discussed above, a primary account user may specify a time constraint for potential enablement of weather constraints. For example, the time constraint may be anytime between dawn and dusk, between 8:00 am and 8:00 pm, or any other user specified time. In other implementations, there may be no time constraint and weather factors evaluated anytime access to digital items is attempted.

If it is determined that the current time is not within the specified time constraint, the example process completes, as in 906. However, if it is determined that the current time is within the time constraint, the specified forecast period and the remaining time until the end of the forecast period is determined, as in 908. A determination is then made as to whether the desired amount of time outside for the secondary account user during the forecast period has been satisfied by the secondary account user, as in 910. For example, if the desired time outside is set to ten hours, it may be determined whether the secondary account user has spent at least ten hours outside during the forecast period.

In some implementations, rather than requiring that the user be outside for the specified period of time and monitoring the user's time outside, the system may monitor an activity level of the user during the specified period of time and enable or restrict access based on the amount of time the user's activity level is above a defined activity level. For example, a pedometer, heart rate monitor, and/or other external device associated with the user may provide information (e.g., steps taken, heart rate) relating to the activity level of the user. The system may receive the information and determine if the user's activity level is above a defined activity level. If the user's activity has been active for a defined period, access to the digital content is enabled, regardless of whether the user is inside or outside. The defined activity level may be any defined activity level. For example, the defined activity level may be a continuous number of steps taken, a defined heart rate, etc., or any combination thereof.

If it is determined that the desired time outside has been satisfied by the secondary account user, the example process 900 completes, as in 906. However, if it is determined that the desired time outside has not been satisfied by the secondary account user, specified weather factors are determined, as in 912.

Specified weather factors may include, but are not limited to, a preferred temperature range, other weather conditions (e.g., sunny, rainy, windy, cloudy, foggy, humidity level, pollen count, wind speed, ultraviolet light index, pressure, dew point, visibility, sunrise, sunset), and/or user factors (e.g., planned activities, travel plans, meetings, historical patterns).

In addition to determining specified weather factors, the current weather at the secondary user's location is also determined, as in 914. Current weather conditions may be determined based on the location of the user and weather forecast data provided by a third party, weather conditions determined by a client device associated with the secondary account user, and/or a weather station or other device at the location of the user. For example, the user's client device may receive weather information from a personal or local weather station near the location of the user. Alternatively, or in addition thereto, the client and/or account management service may receive weather information from a third party, such as ACCUWEATHER.

A determination is then made as to whether the current weather at the location of the secondary account user satisfies the determined weather factors, as in 916. In some implementations, it may be determined that the current weather satisfies the determined weather factors if one of the current weather conditions corresponds with a determined weather factor. In other implementations, it may be determined that the current weather conditions satisfy the determined weather factors if a majority of the weather factors are satisfied. In still other implementations, for the weather factors to be satisfied, they must all correspond with the current weather conditions.

If it is determined that the current weather conditions do not satisfy the determined weather factors, the example process 900 completes, as in 906. However, if it is determined that the current weather conditions satisfy the determined weather factors, access to digital items is restricted, as in 918. As discussed above, in some implementations, access to all digital items via all devices associated with the secondary account profile may be restricted. In other implementations, the primary account user may specify which digital items and/or which types of digital items are to be restricted. For example, the primary account user may specify that all digital items are to be restricted when weather constraints are enabled. In other embodiments, the primary account user may specify that some digital items and/or some types of digital items may not be restricted and/or may allow access to some digital items if the secondary account user is outside. For example, the primary account user may specify that educational content is not restricted and/or that access to digital books is not restricted if the secondary account user is located outside.

As discussed above, the primary account user may specify that the details (e.g., weather factors) of weather constraint enablement are to be maintained by the account management service. In such an implementation, the example process 900 may be managed and/or determined entirely by the account management service. In other implementations, a portion of the example process 900 may be managed and/or determined by the account management service and other portions may be specified by a primary account user. For example, the primary account user may specify a forecast period and/or time constraints and the account management service may provide other weather factors (e.g., preferred temperature range, weather conditions). For example, the account management service may determine preferred weather conditions based on historical information, information from third parties and/or based on information from other users. Utilizing the information, the example implementations discussed herein may be performed.

Figure 10:
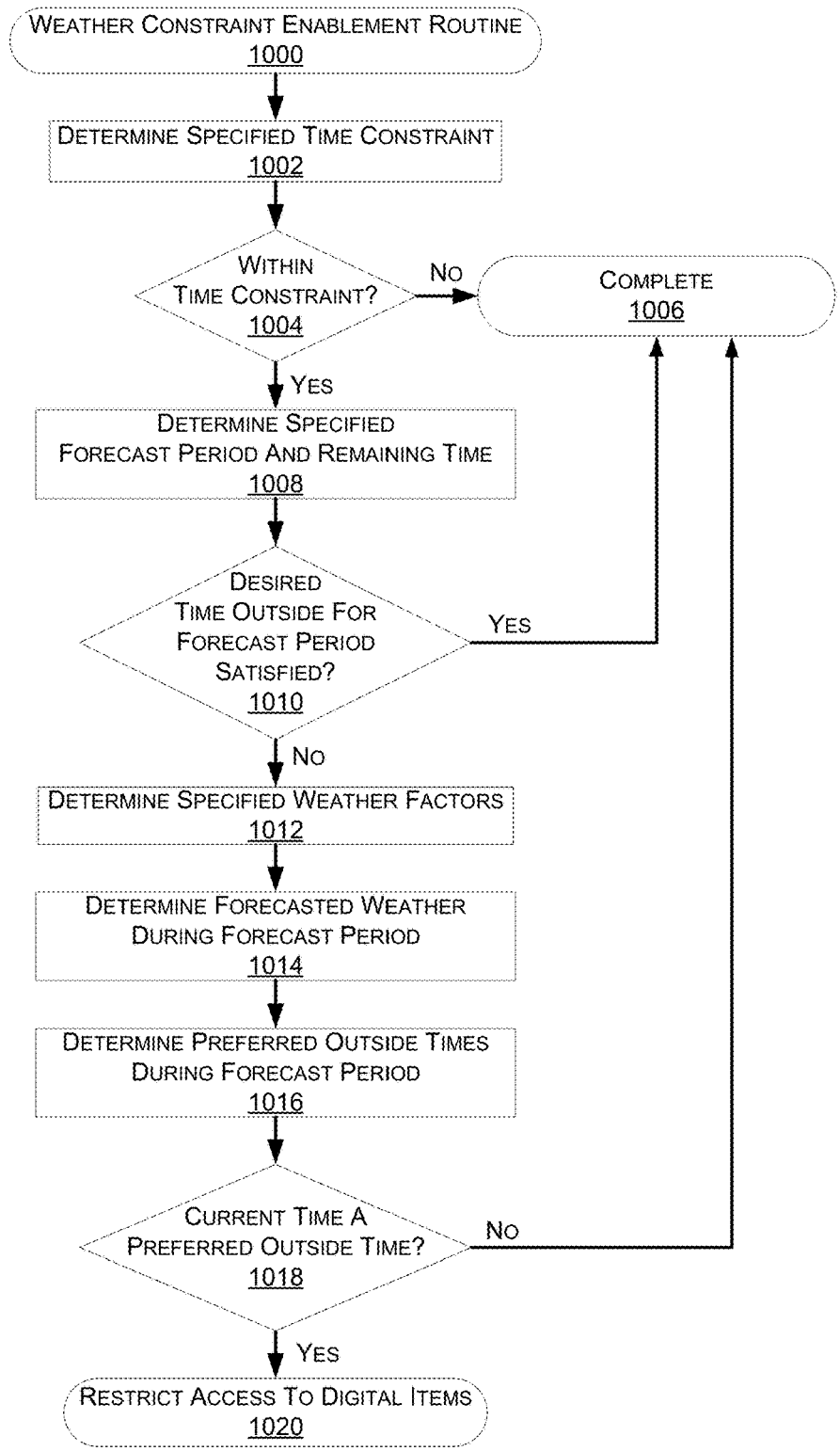
FIG. 10 is a flow diagram of another example weather constraint enablement routine, in accordance with an implementation.

FIG. 10 is a flow diagram of another example weather constraint enablement routine 1000, in accordance with an implementation. The weather constraint enablement routine 1000 may be applied and used with any account profile, such as a primary account profile, a secondary account profile, etc. This example describes the weather constraint enablement routine with respect to a secondary account profile and a secondary account user.

The example process 1000 begins by determining if the current time is within a specified time constraint, as in 1004. As discussed above, a primary account user may specify a time constraint for potential enablement of weather constraints, as in 1002. For example, the time constraint may be anytime between dawn and dusk, between 8:00 am and 8:00 pm, or any other user specified time. In other implementations, there may be no time constraint and weather factors evaluated anytime access to digital items is attempted.

If it is determined that the current time is not within the specified time constraint, the example process completes, as in 1006. However, if it is determined that the current time is within the time constraint, the specified forecast period and the remaining time until the end of the forecast period is determined, as in 1008. A determination is then made as to whether the desired amount of time outside for the secondary account user during the forecast period has been satisfied by the secondary account user, as in 1010. For example, if the desired time outside is set to ten hours, it may be determined whether the secondary account user has spent at least ten hours outside during the forecast period.

If it is determined that the desired time outside has been satisfied by the secondary account user, the example process 1000 completes, as in 1006. However, if it is determined that the desired time outside has not been satisfied by the secondary account user, specified weather factors are determined, as in 1012.

Specified weather factors may include, but are not limited to, a preferred temperature range, other weather conditions (e.g., sunny, rainy, windy, cloudy, foggy, humidity level, pollen count, wind speed, ultraviolet light index, pressure, dew point, visibility), and/or user factors (e.g., planned activities, travel plans, meetings, historical patterns).

In addition to determining specified weather factors, the forecasted weather during the forecast period at the location of the secondary account user is determined, as in 1014. For example, if the forecast period is five days, the forecasted weather for the remaining days of the forecast period may be determined. As discussed above, forecasted weather may be obtained from a third party service, from a client device and/or from another device (e.g., home weather station) accessible by the user, a client device of the user and/or the account management service. Based on the forecasted weather and the determined weather factors, preferred outside times are determined during the remaining portion of the forecast period, as in 1016. For example, the times of the remaining forecast period that are within the specified time constraints may be segmented into sample periods (e.g., hourly) and a preferred weather score computed for each sample based on the weather forecast and the determined weather factors. In such an implementation, rather than restricting access to digital items if the weather factors are satisfied, the remaining time the secondary account user is to be outside may be determined and the sample periods with the highest preferred weather scores may be selected as the times when access to digital items is restricted. For example, if the secondary account user still needs to be outside for another four hours before the desired time outside is satisfied for the forecast period, and there are three days remaining in the forecast period, the example process 1000 may determine the four one-hour periods with the highest preferred weather scores and restrict access to digital items only during those times.

Preferred weather scores may be computed based on one or more of the forecasted weather and the determined weather factors. For example, each determined weather factor may be assigned a weighting factor based on whether the weather factor is satisfied and the weighted weather factors for each sample period may be summed to determine a preferred weather score for the sample period. In some implementations, if the weather factor is a range (e.g., temperature range, humidity range, pollen count range), different weighting factors may be assigned to different values falling within the specified range. For example, any forecasted weather falling within one standard deviation of the median of the preferred weather condition range may be assigned a weighting value of one. Any weather forecast between one and two standard deviations of the median may be assigned a weighting value of 0.5 and any weather forecasts above two standard deviations from the median, but within the specified preferred weather condition range, may be assigned a weighting value of 0.25. Finally, any weather forecast outside the specified preferred weather condition may be assigned a weighting value of 0. Likewise, specified weather factors that are not ranges may be assigned a weighting value of 0 (not satisfied) or a defined positive value (satisfied). The weighting factors applied to each weather factor for each sample period may be summed to determine a weather score for the sample period.

Based on the weather scores, the remaining time needed outside to satisfy the desired time outside and the remaining time of the forecast period are considered and preferred outside times may be determined that, if utilized, will provide sufficient time for the secondary account user to be outside.

Based on the determined preferred outside times, a determination is made as to whether the current time is a preferred outside time, as in 1018. If it is determined that the current time is not a preferred outside time, the example process 1000 completes, as in 1006. However, if it is determined that the current time is a preferred outside time, access to digital items is restricted, as in 1020. As discussed above, in some implementations, access to all digital items via all devices associated with the secondary account profile may be restricted. In other implementations, the primary account user may specify which digital items and/or which types of digital items are to be restricted. For example, the primary account user may specify that all digital items are to be restricted during preferred outside times. In other implementations, the primary account user may specify that some digital items and/or some types of digital items may not be restricted and/or may allow access to some digital items if the secondary account user is outside. For example, the primary account user may specify that educational content is not restricted and/or that access to digital books is not restricted if the secondary account user is located outside.

The example processes 900 and/or 1000 may be performed periodically and the determination as to whether the current weather conditions satisfy the weather factors (decision block 916, FIG. 9) and/or which sample periods are determined preferred outside times (1016, FIG. 10) may be periodically updated based on changes to the weather forecast, based on the time spent outside by the secondary account user and/or based on the time remaining during the forecast period.

Figure 11:
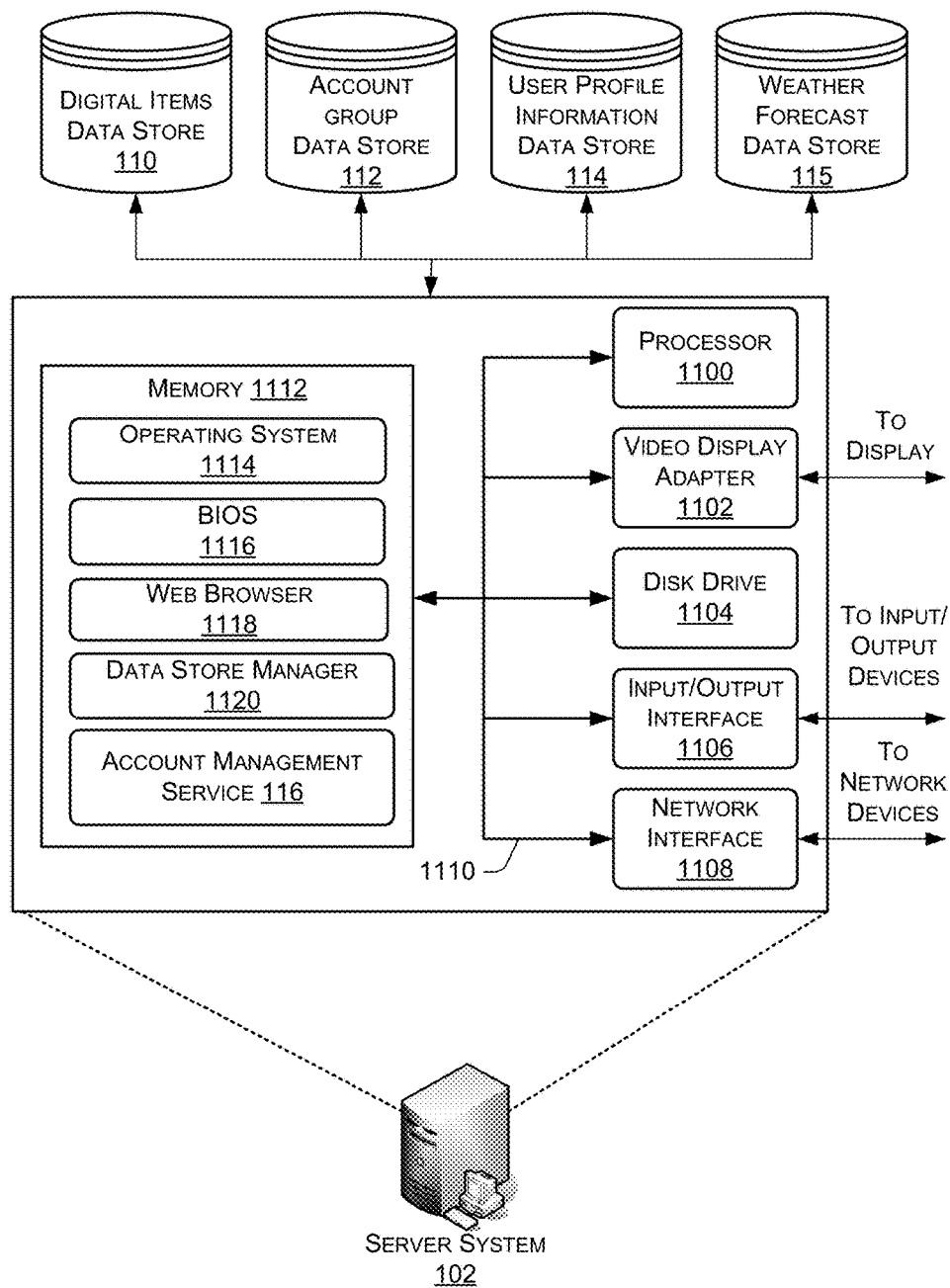
FIG. 11 is a pictorial diagram of an illustrative implementation of a server system that may be used in the computing environment of FIG. 1.

FIG. 11 is a pictorial diagram of an illustrative implementation of a server system, such as the server system 102, that may be used in the environment of FIG. 1. The server system 102 may include a processor 1100, such as one or more redundant processors, a video display adapter 1102, a disk drive 1104, an input/output interface 1106, a network interface 1108, and a memory 1112. The processor 1100, the video display adapter 1102, the disk drive 1104, the input/output interface 1106, the network interface 1108, and the memory 1112 may be communicatively coupled to each other by a communication bus 1110.

The video display adapter 1102 provides display signals to a local display (not shown) permitting an operator of the server system 102 to monitor and configure operation of the server system 102. The input/output interface 1106 likewise communicates with external input/output devices not shown in FIG. 11, such as a mouse, keyboard, scanner, or other input and output devices that can be operated by an operator of the server system 102. The network interface 1108 includes hardware, software, or any combination thereof, to communicate with other computing devices. For example, the network interface 1108 may be configured to provide communications between the server system 102 and other computing devices, such as the client device 104, via the network 108, as shown in FIG. 1.

The memory 1112 generally comprises random access memory (RAM), read-only memory (ROM), flash memory, and/or other volatile or permanent memory. The memory 1112 is shown storing an operating system 1114 for controlling the operation of the server system 102. A binary input/output system (BIOS) 1116 for controlling the low-level operation of the server system 102 is also stored in the memory 1112.

The memory 1112 additionally stores program code and data for providing network services that allow client devices 104 to exchange information and data files with the server system 102 and/or the account management service 116. Accordingly, the memory 1112 may store a browser application 1118. The browser application 1118 comprises computer executable instructions, that, when executed by the processor 1100, generate or otherwise obtain configurable markup documents such as Web pages. The browser application 1118 communicates with a data store manager application 1120 to facilitate data exchange and mapping between the digital items data store 110, the account group data store 112, the user profile information data store 114, and/or client devices, such as the client device 104 shown in FIG. 1.

As used herein, the term "data store" refers to any device or combination of devices capable of storing, accessing and retrieving data, which may include any combination and number of data servers, databases, data storage devices and data storage media, in any standard, distributed or clustered environment. The server system 102 can include any appropriate hardware and software for integrating with the data stores 110-115 as needed to execute aspects of one or more applications for the client device 104, the external sources 107 and/or the account management service 116, such as weather constraints. The server system 102 provides access control services in cooperation with the data stores 110-115 and is able to generate content such as text, graphics, audio, video and/or group related information (e.g., criteria, access patterns, user interfaces) to be transferred to the client device 104.

The data stores 110-115 can include several separate data tables, databases or other data storage mechanisms and media for storing data relating to a particular aspect. For example, the data stores 110-115 illustrated include mechanisms for storing content, user information, rights, rules, profiles, weather forecasts, to support enablement of weather constraints and control of content made accessible via the client devices 104.

It should be understood that there can be many other aspects that may be stored in the data stores 110-115, such as access rights information, which can be stored in any of the above listed mechanisms as appropriate or in additional mechanisms of any of the data stores 110-115. The data stores 110-115 are operable, through logic associated therewith, to receive instructions from the server system 102 and obtain, update or otherwise process data in response thereto. In one example, a primary account user may specify a group right that prohibits access to a particular digital item. In this case, the account group data store 112 might be accessed and the right stored with the account group. The right can then be maintained and applied to each corresponding secondary account profile.

The memory 1112 may also include the account management service 116, discussed above. The account management service 116 may be executable by the processor 1100 to implement one or more of the functions of the server system 102. In one implementation, the account management service 116 may represent instructions embodied in one or more software programs stored in the memory 1112. In another implementation, the account management service 116 can represent hardware, software instructions, or a combination thereof.

The server system 102, in one implementation, is a distributed environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 11. Thus, the depiction in FIG. 11 should be taken as being illustrative in nature and not limiting to the scope of the disclosure.

Figure 12:
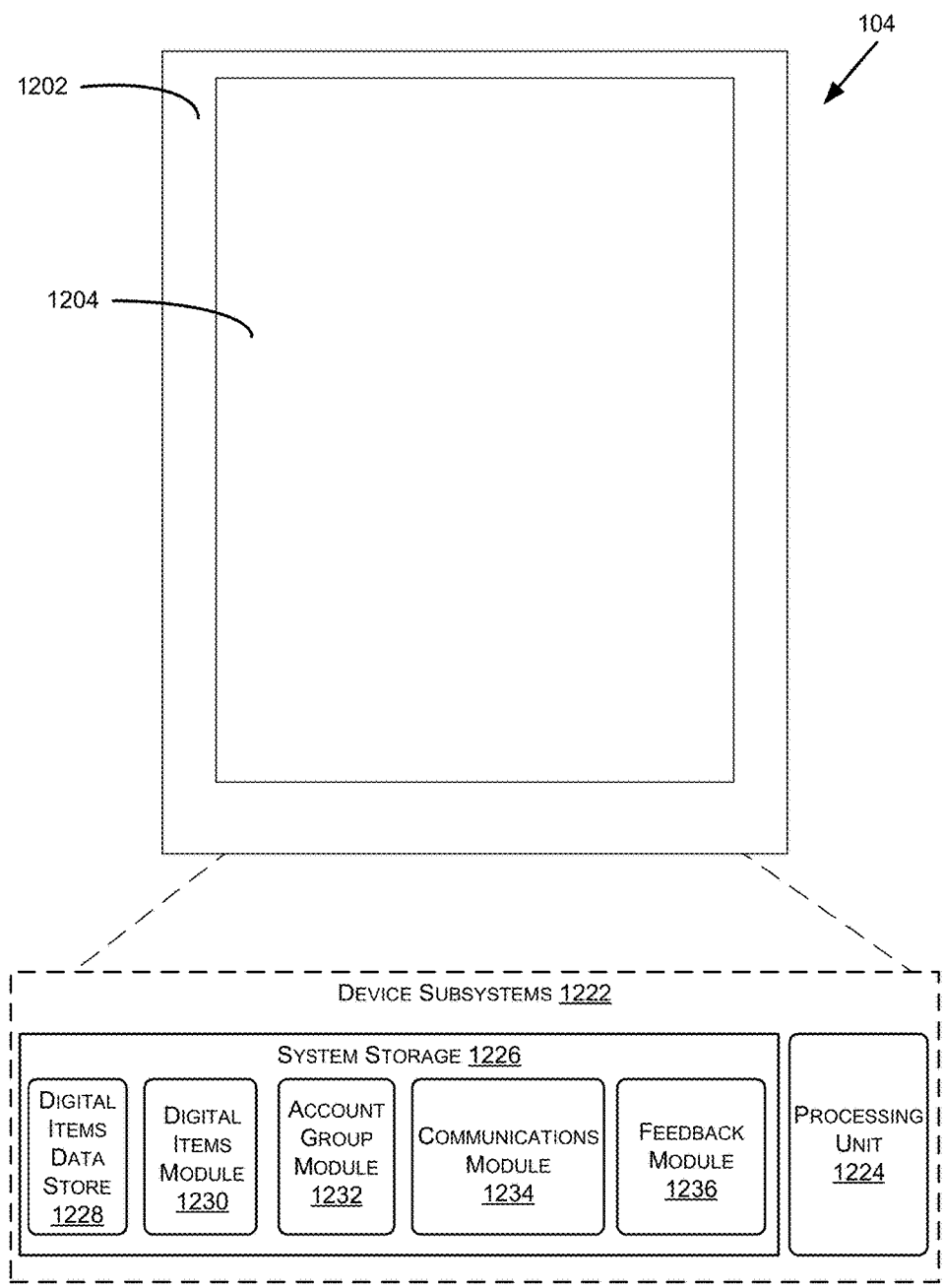
FIG. 12 is a pictorial diagram of an illustrative client device that may be used in the computing environment of FIG. 1.

FIG. 12 is a pictorial diagram of an illustrative client device 104 that may be used with the computing environment of FIG. 1. Any type of client device may be used to facilitate account groups and allow or restrict access to digital items according to profiles and/or weather constraints. The client device 104 includes a body or housing 1202, and a display 1204.

The display 1204 presents content in a human-readable format to the user. The content presented in the display 1204 may be digital items, such as electronic books, newspapers, or other readable or viewable materials. For example, the display 1204 provides the text of the e-books and also depicts any illustrations, tables, or graphic elements that might be contained in the e-books. The display may also be a touch based display that allows a user of the client device 104 to interact with the displayed information by touching the display 1204.

The client device 104 may also include a variety of user input devices (not shown) to navigate through and among digital items. Examples of other user input devices include buttons, scroll wheels, thumb wheels, thumb sticks, sensors that detect and register movement of a user's thumb or finger, tactile sensors, or any other conventional user input mechanism.

The client device 104 also has various internal components, which are referred to generally as client device subsystems 1222. In one implementation, the client device subsystem 1222 includes system storage 1226 and a processing unit 1224. The processing unit 1224 interacts with the system storage 1226 to facilitate operation of the client device 104. The system storage 1226 may include volatile memory (such as RAM), nonvolatile memory, removable memory, and/or non-removable memory, implemented in any method or technology for storage of information, such as computer-readable instructions, data structures, program modules, or other data. Also, the processing unit 1224 may include onboard memory in addition to or instead of the system storage 1226. Some examples of storage media that may be included in the system storage 1226 and/or processing unit 1224 include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by the client device 104. Any such computer storage media may be part of the client device 104.

The system storage 1226 may include a digital items data store 1228 and modules 1230-1236. Further, the system storage 1226 may store an application for browsing Web pages. The digital items data store 1228 may include one or more digital items received from a server system, such as the server system 102 in FIG. 1 and FIG. 11. For example, the client device 104 may be configured to invoke the digital items module 1230 to download electronic versions of books from a server system and store the data associated with the electronic versions of the books in the digital items data store 1228. In some instances, the digital items may be purchased utilizing the client device 104 via an online service or shopping session provided by the server system.

The account group module 1232 may be configured to facilitate participation in one or more account groups. In a particular embodiment, the account group module 1232 is configured to receive account group profiles, rights and/or other information from a server system. For example, the account group information received by the account group module 1232 may include secondary account group profiles specifying rights associated with a particular user and/or weather constraints for the particular user, account group and/or user profile. In some embodiments, the account group module 1232 may receive the profiles in response to downloading account group information from a server system, such as the server system 102 of FIG. 1 and FIG. 11.

The communications module 1234 is configured to facilitate communication between a user of the client device 104 and the account management service 116. The communications module 1234 may be configured to facilitate audio communications, video communications, text messaging, email, a chat session, or a combination thereof.

The feedback module 1236 may be configured to provide a feedback user interface to enter reviews, comments, annotations and other feedback related to a digital item being viewed via the client device 104. The feedback module 1236 may also be configured to provide a user of the client device 104 with the option of sending the provided feedback to be stored at a remote data store accessible to a server system, such as the server system 102 of FIG. 1 and FIG. 11, where the feedback may be accessible to other account group members. In addition, the feedback module 1236 may provide a user of the client device 104 with the option of storing feedback locally at a feedback data store (not shown). In some implementations, feedback may be shared between members of other groups.

Feedback may be received in a visual form, in an audio form, or a combination thereof. For example, feedback may be expressed via handwriting, text, formatting, such as highlighting, an attachment of image files, an attachment of audio files, or a combination thereof. Feedback may be words, graphs, formulae, files, images, enhancements, etc., provided by a commentator. By way of illustration, feedback can also be in the form of a link or address to another page, file, or document available to the server system 102 or client device 104. There is virtually no limitation to the type, form and content of feedback that can be added to or associated with a digital item.

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. A method for controlling access to digital items, the method comprising:

under control of one or more computing devices configured with executable instructions, the executable instructions stored on a non-transitory computer readable medium, determining a forecast period during which a weather factor is to be evaluated;

receiving weather information from a third party that corresponds to the forecast period;

determining a first sample period that is a portion of the forecast period;

determining a second sample period that is a portion of the forecast period and different than the first sample period;

determining, based at least in part on the weather factor and the weather information, the first sample period is a preferred outside time over the second sample period;

restricting access via a client device to a digital item by a secondary account user associated with a secondary account during the preferred outside time;

determining, based at least in part on sensor information received from at least a second sensor, an amount of time outside by the secondary account user associated with a secondary account during the preferred outside time;

providing to a device of a primary account user an indication of the amount of time outside by the secondary account user;

receiving from the device an indication of an approval by the primary account user of the amount of time outside; and in response to receiving the approval, performing an action with respect to the secondary account, wherein the action includes at least one of enabling access by the secondary account to an application, enabling a purchase through the secondary account of a digital item, or enabling access by the secondary account to a digital item.

2. The method of claim 1, further comprising:

receiving from at least one device associated with the secondary account user an indication of an activity or a location of the secondary account user; and wherein determining the amount of time outside is based at least in part on the indication of the activity or the location of the secondary account user.

3. The method of claim 1, further comprising:

receiving from a first source an indication of at least a portion of the amount of time outside by the secondary account user; and wherein determining the amount of time outside is based at least in part on the indication of the at least a portion of the amount of time outside by the secondary account user.

4. The method of claim 3, wherein the first source is at least one of a client device associated with the secondary account user, a wearable device associated with the secondary account user, a submission from the secondary account user, a submission from the primary account user, or a submission from an extended account user.

5. The method of claim 1, further comprising:

receiving during the preferred outside time, a plurality of indications of a time outside by the secondary account user; and wherein determining the amount of time outside is based at least in part on the plurality of indications and is representative of an amount of time outside by the secondary account user during the preferred outside time.

6. A computer-implemented method, comprising:

under control of one or more computing systems configured with executable instructions, the executable instructions stored on a non-transitory computer readable medium, determining a forecast period during which a weather factor is to be evaluated;

receiving weather information from a third party that corresponds to the forecast period;

determining a first sample period that is a portion of the forecast period;

determining a second sample period that is a portion of the forecast period and different than the first sample period;

determining, based at least in part on the weather factor and the weather information, the first sample period is a preferred outside time over the second sample period;

restricting access via a client device to a digital item by a secondary account user associated with a secondary account during the preferred outside time;

determining, based at least in part on sensor information received from at least a second sensor, an amount of time outside by the secondary account user during the forecast period;

providing to a primary account, an indication of the amount of time outside by the secondary account user, wherein the primary account is associated with the secondary account;

receiving from the primary account an approval of the amount of time outside by the secondary account user; and in response to receiving the approval, performing an action with respect to the secondary account.

7. The computer-implemented method of claim 6, further comprising:

receiving from a plurality of sources and during the forecast period, indications of time outside by the secondary account user; and wherein the amount of time outside by the secondary account user is a sum of the indications of time outside received from each of the plurality of sources during the forecast period.

8. The computer-implemented method of claim 6, wherein providing to the primary account the indication of the amount of time outside by the secondary account user associated with the secondary account includes providing an indication of a source of the amount of time outside.

9. The computer-implemented method of claim 8, wherein the source is at least one of a client device associated with the secondary account user, a wearable device associated with the secondary account user, a submission from the secondary account user, or a submission from a primary user.

10. The computer-implemented method of claim 6, further comprising:

determining a plurality of preferred outside times during the forecast period; and restricting access via the client device to the digital item during each of the preferred outside times.

11. The computer-implemented method of claim 6, wherein determining a preferred outside time is further based on at least one of a sunrise time or a sunset time.

12. The computer-implemented method of claim 6, wherein the action is at least one of enabling access by the secondary account to an application, enabling a purchase through the secondary account of a digital item, or enabling access by the secondary account to a digital item.

13. The computer-implemented method of claim 6, further comprising:

restricting access via a second device to the digital item by the secondary account user during the preferred outside time.

14. A computing system comprising:

one or more processors; and a memory coupled to the one or more processors and storing program instructions that when executed by the one or more processors cause the one or more processors to at least:

determining a forecast period during which a weather factor is to be evaluated;

receiving weather information from a third party corresponding to the forecast period;

determining a first sample period that is a portion of the forecast period;

determining a second sample period that is a portion of the forecast period and different than the first sample period;

determining, based at least in part on the weather factor and the weather information, the first sample period is a preferred outside time over the second sample period;

restricting access via a client device to a digital item by a secondary account user associated with a secondary account during the preferred outside time;

determine, based at least in part on sensor information received from at least a second sensor, an amount of time outside for the secondary account user associated with a secondary account during preferred outside time;

provide to a primary account, an indication of the amount of time outside by the secondary account user, wherein the primary account is associated with the secondary account;

receive from the primary account, an approval of the amount of time outside by the secondary account user; and in response to receipt of the approval, perform an action with respect to the secondary account.

15. The computing system of claim 14, wherein the program instructions further cause the one or more processors to at least:

restrict access via the secondary account to a plurality of digital items during at least a portion of the forecast period.

16. The computing system of claim 15, wherein access to the plurality of digital items is restricted by at least one of an account management service or a client device associated with the secondary account.

17. The computing system of claim 14, wherein the program instructions further cause the one or more processors to at least:

receive from at least one device associated with the secondary account an indication of an activity or a location of the secondary account user; and wherein the amount of time outside is determined based at least in part on the indication of the activity of the location of the secondary account user.

18. The computing system of claim 14, wherein the program instructions further cause the one or more processors to at least:

receive during the forecast period, a plurality of indications of the time outside by the secondary account user; and wherein the amount of time outside is determined based at least in part on the plurality of indications.

19. The method of claim 1, further comprising:

determining, based on information received from the device of the primary account user, a first type of digital item; and wherein:

restricting access includes restricting access to all digital items of the first type; and the digital item is of the first type.

20. The method of claim 19, further comprising:

determining, based on information received from the device of the primary account user, a second type of digital item; and wherein access to a second digital item of the second type is not restricted while access to the first type is restricted.

21. The method of claim 20, wherein the second type of digital item is educational content.

22. The method of claim 1, further comprising:

maintaining, in a data store, information indicating that the primary account user and the secondary account user are included in an account group.

23. The method of claim 22, wherein the account group is established by the primary account user.

24. The method of claim 1, wherein the weather factor includes at least one of a temperature range, a weather condition of sunny, a weather condition of rainy, a weather condition of windy, a weather condition of cloudy, a weather condition of foggy, a humidity level, a pollen count, a wind speed, an ultraviolet light index, a pressure, a dew point, a visibility, a sunrise, a sunset, a planned activity, a travel plan, or a historical pattern.

* * * * *